US008261773B2

(12) United States Patent
Tower

(10) Patent No.: US 8,261,773 B2
(45) Date of Patent: Sep. 11, 2012

(54) MULTI-POSITION MICRO-FLUIDIC VALVE SYSTEM WITH REMOVABLE ENCODER ASSEMBLY

(75) Inventor: Christopher R. Tower, Vallejo, CA (US)

(73) Assignee: IDEX Health & Science LLC, Northbrook, IL (US)

( * ) Notice: Subject to any disclaimer, the term of this patent is extended or adjusted under 35 U.S.C. 154(b) by 567 days.

(21) Appl. No.: 12/512,925

(22) Filed: Jul. 30, 2009

(65) Prior Publication Data
US 2011/0024657 A1 Feb. 3, 2011

(51) Int. Cl.
*F16K 37/00* (2006.01)
(52) U.S. Cl. ......................................... 137/554; 33/1 PT
(58) Field of Classification Search .................. 137/554; 33/1 PT
See application file for complete search history.

(56) References Cited

U.S. PATENT DOCUMENTS

| | | | | |
|---|---|---|---|---|
| 3,297,053 | A * | 1/1967 | McKinney | 137/625.46 |
| 4,156,437 | A * | 5/1979 | Chivens et al. | 137/554 |
| 4,428,511 | A * | 1/1984 | Howell | 137/624.18 |
| 5,502,380 | A * | 3/1996 | Sittler et al. | 137/554 |
| 6,267,143 | B1 | 7/2001 | Schick | |
| 6,279,870 | B1 | 8/2001 | Welz, Jr. et al. | |
| 6,412,182 | B1 * | 7/2002 | Reichl et al. | 33/1 PT |
| 7,201,185 | B2 | 4/2007 | Poppe et al. | |
| 7,308,908 | B2 | 12/2007 | Keene et al. | |
| 7,855,552 | B2 * | 12/2010 | Steinich | 33/1 PT |
| 2005/0199304 | A1 | 9/2005 | Poppe et al. | |

FOREIGN PATENT DOCUMENTS
EP 1 775 504 4/2007

OTHER PUBLICATIONS

International Search Report dated Dec. 2, 2010 from International Application No. PCT/US2010/039073.
Written Opinion dated Dec. 2, 2010 from International Application No. PCT/US2010/039073.

* cited by examiner

*Primary Examiner* — Eric Keasel
(74) *Attorney, Agent, or Firm* — Beyer Law Group LLP

(57) ABSTRACT

A micro-fluidic valve actuator assembly is provided for controlling a multi-position micro-fluidic valve device for switching between a plurality of discrete fluid distribution positions. The actuator assembly includes a housing having an exterior wall and an interior wall defining an interior through-chamber. A drive assembly is rotatably positioned within the chamber, having a drive axis of rotation positioned substantially co-axial with the chamber axis. A removable, stand alone, self contained encoder assembly is positioned within the actuator housing. The encoder assembly includes an encoder shaft rotatably mounted to a support structure for rotation about an encoder shaft axis. The encoder assembly further includes an encoder wheel mounted to the encoder shaft for rotation about the encoder shaft axis, and an encoder module mounted to the support structure. The encoder module cooperates with the encoder wheel, as a preset unit, to determine the rotational position of the encoder shaft about the encoder shaft axis. When the encoder assembly is oriented in a mounting position, the encoder shaft can be rotatably coupled to the drive assembly, while the support structure is free of rigid coupling directly to the housing.

57 Claims, 14 Drawing Sheets

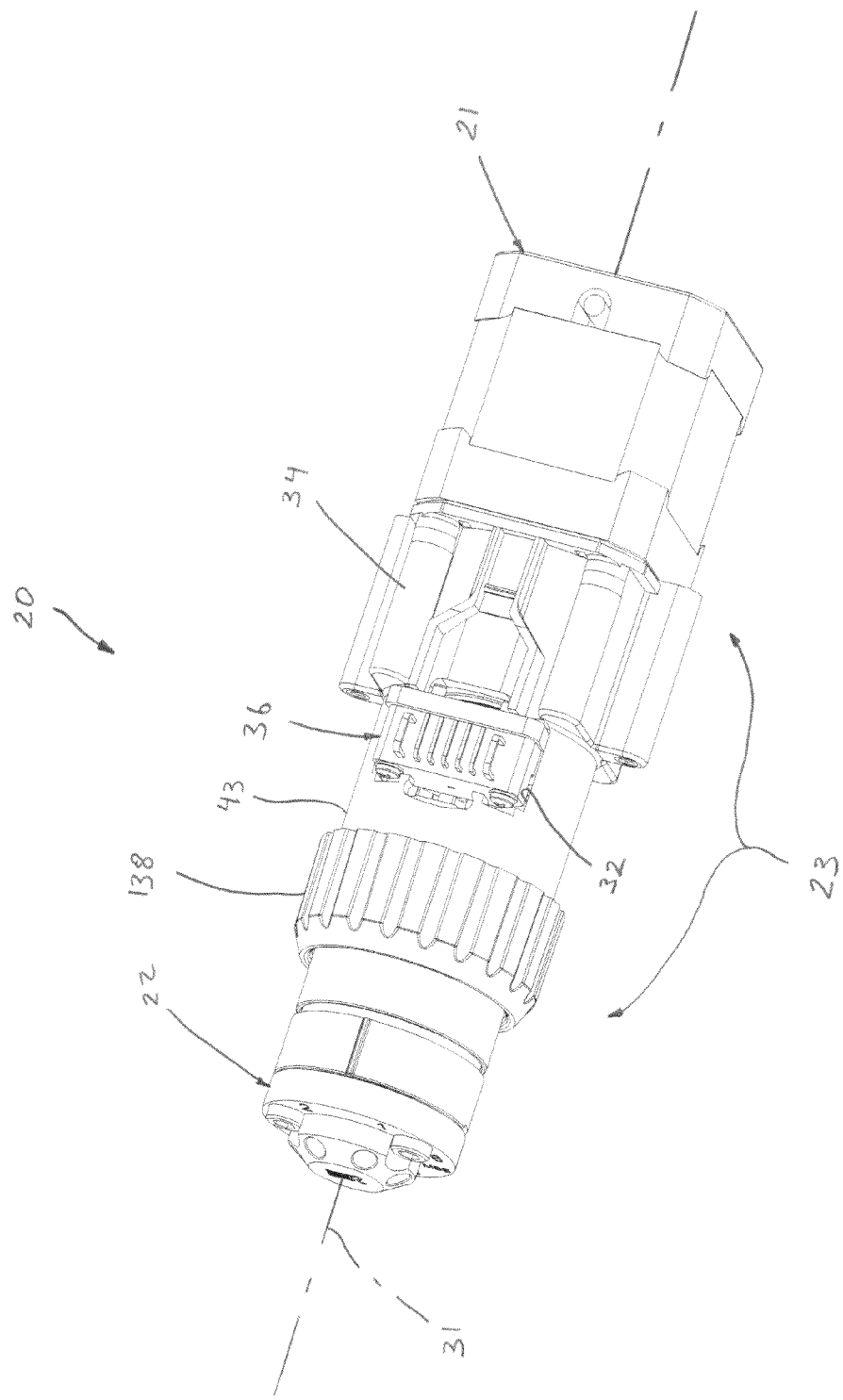
FIG._1

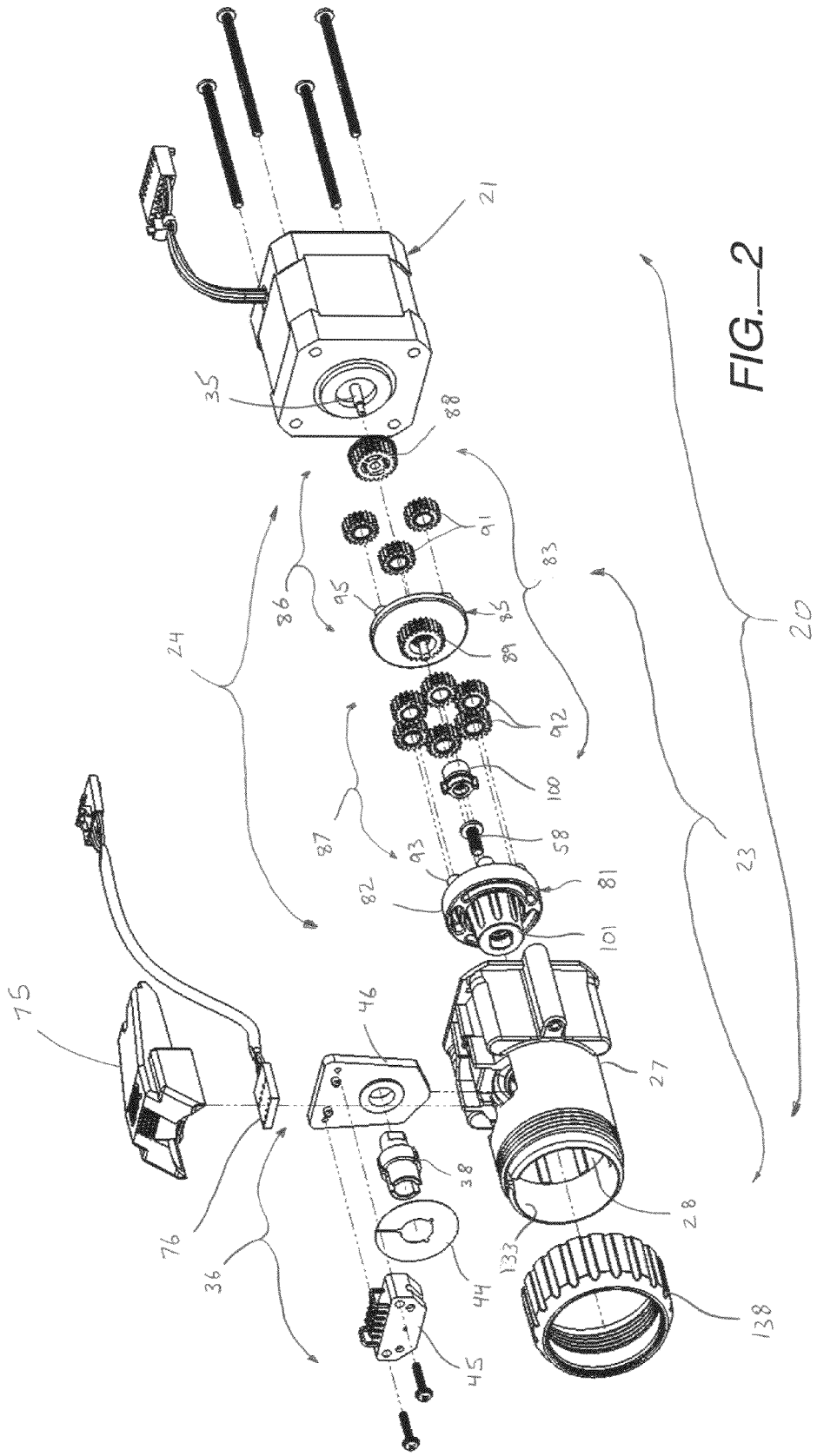
FIG._2

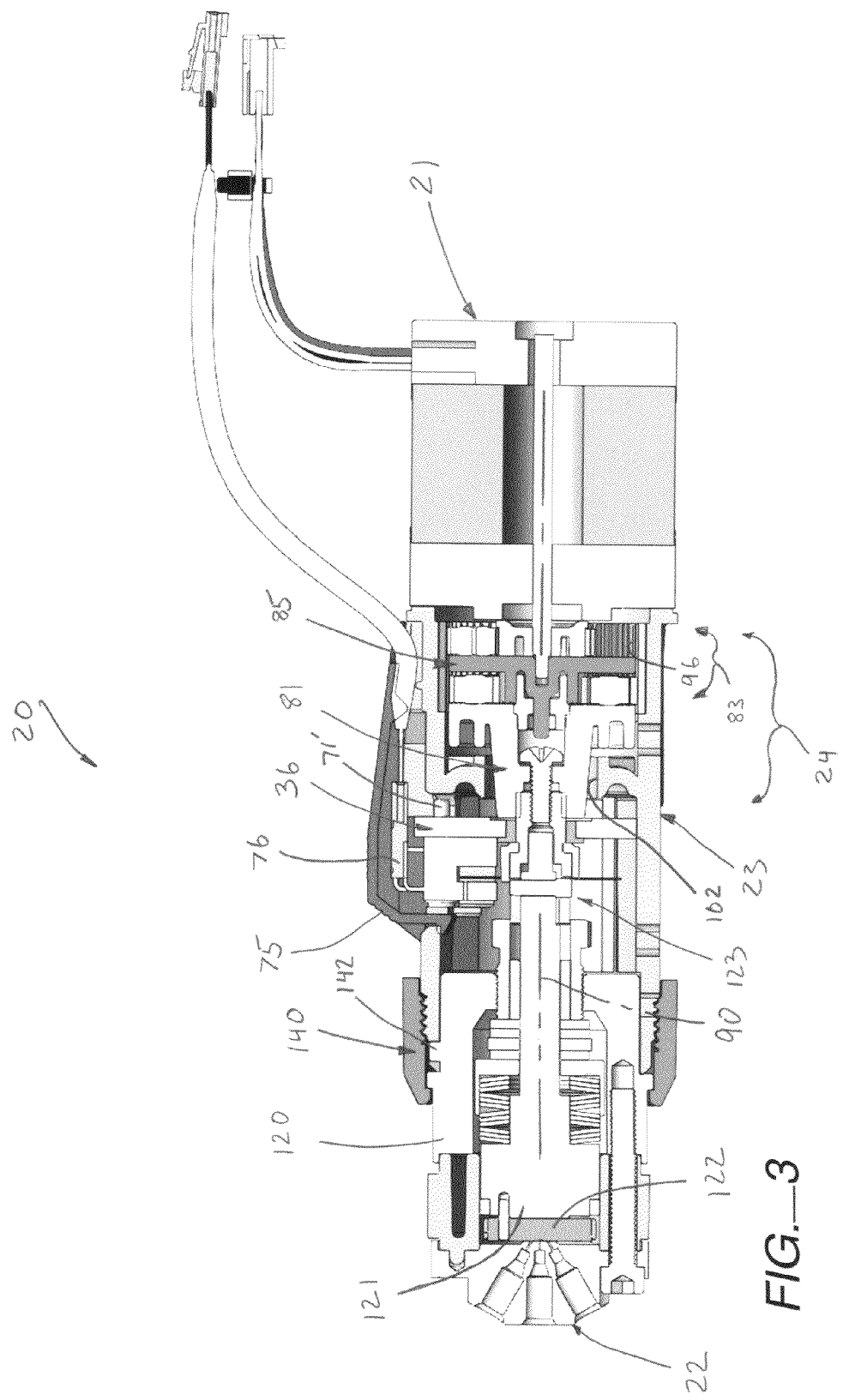
FIG._3

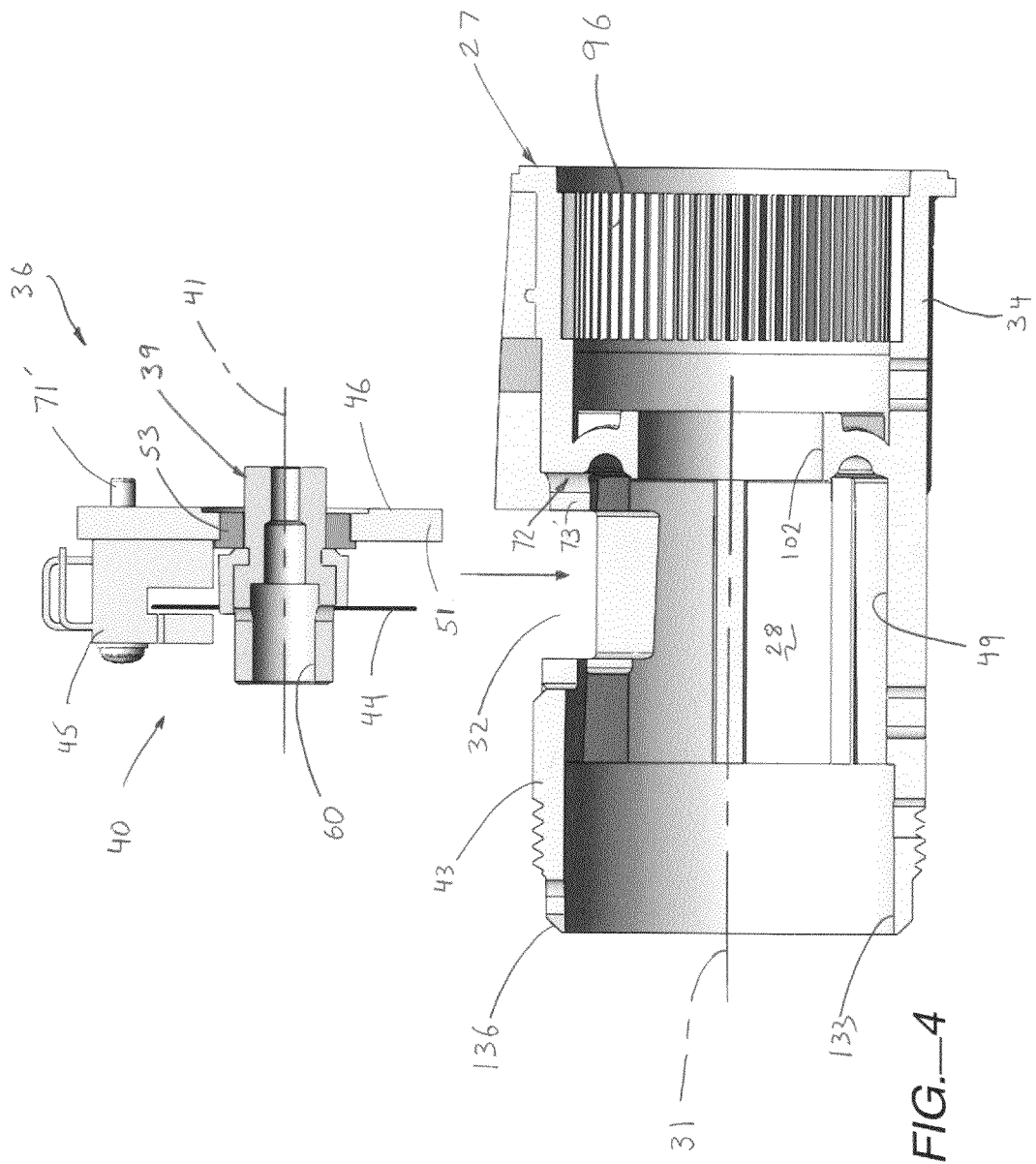
FIG._4

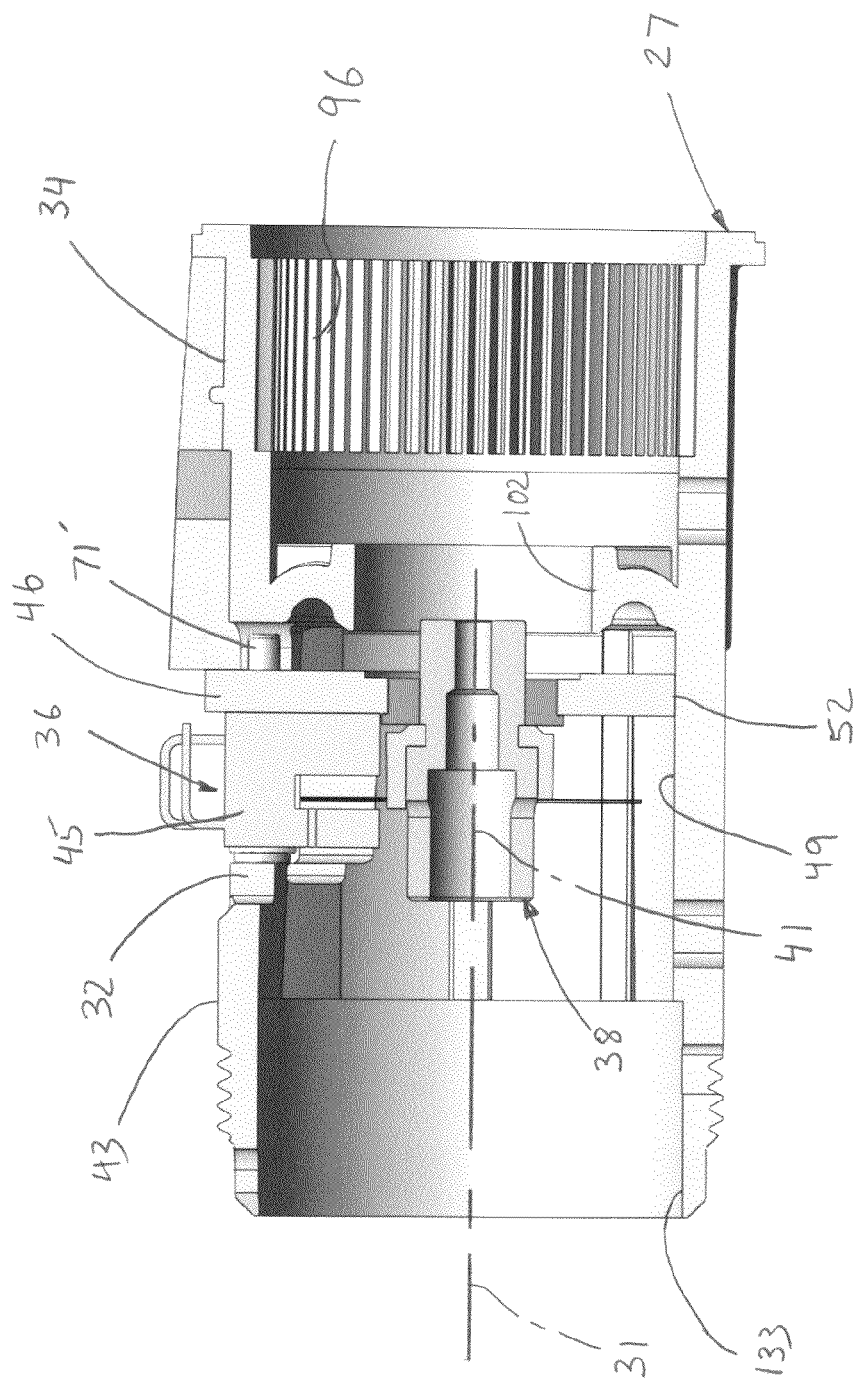
FIG._5

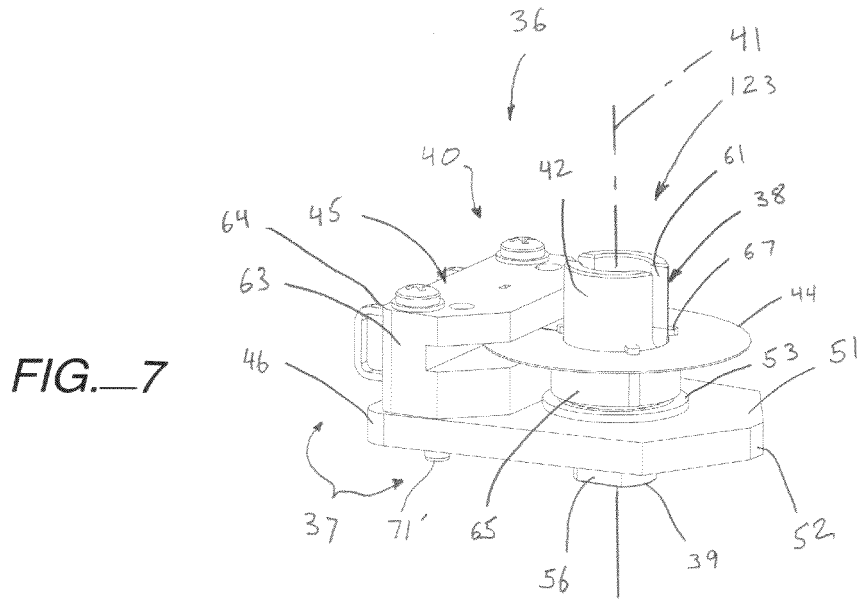
FIG._7
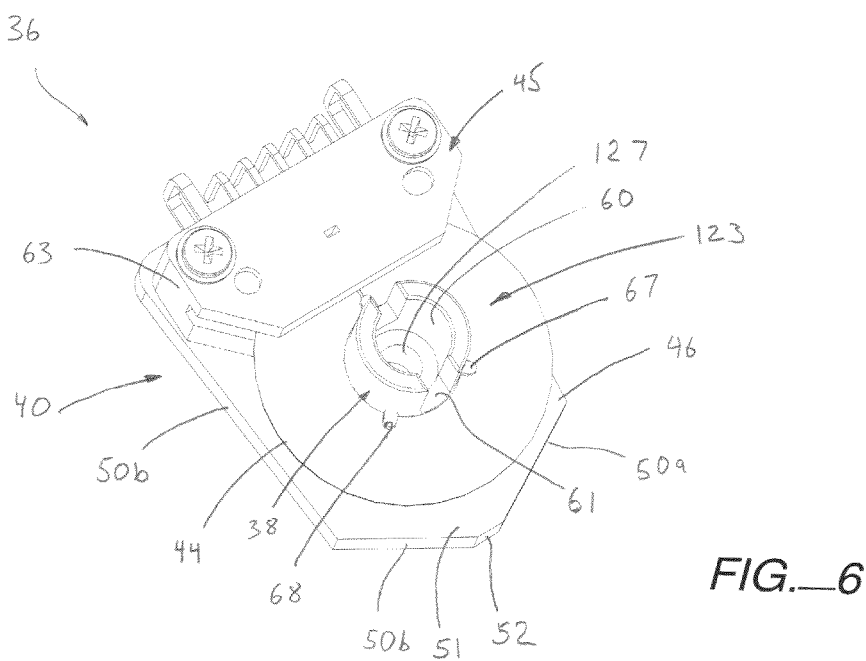
FIG._6

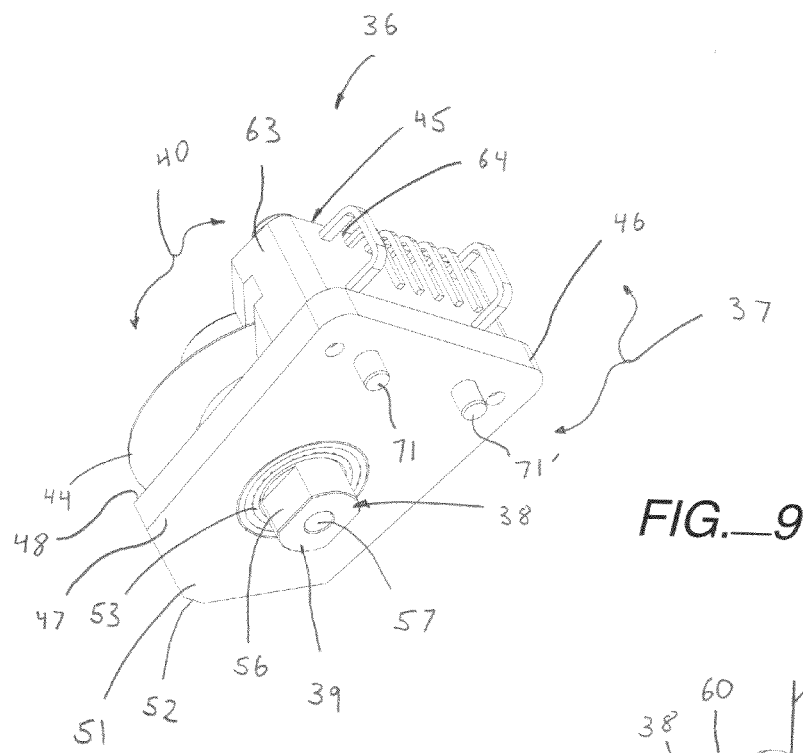
FIG._9
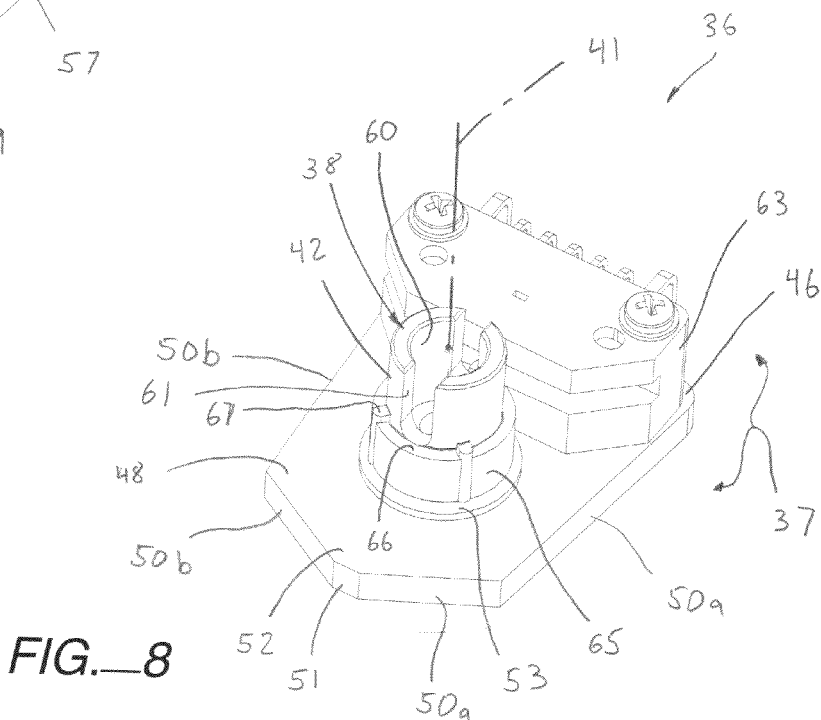
FIG._8

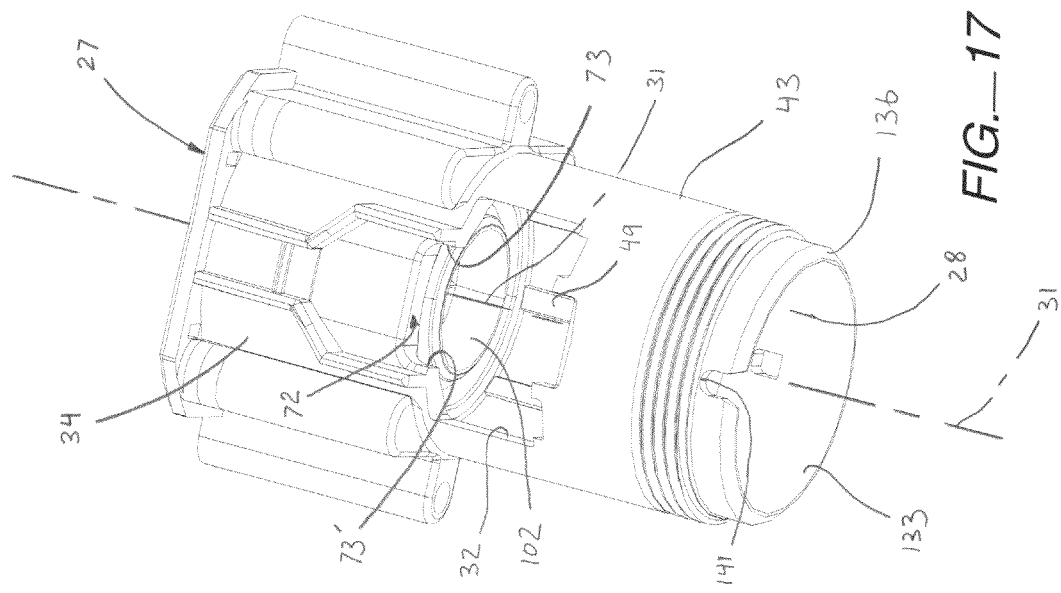
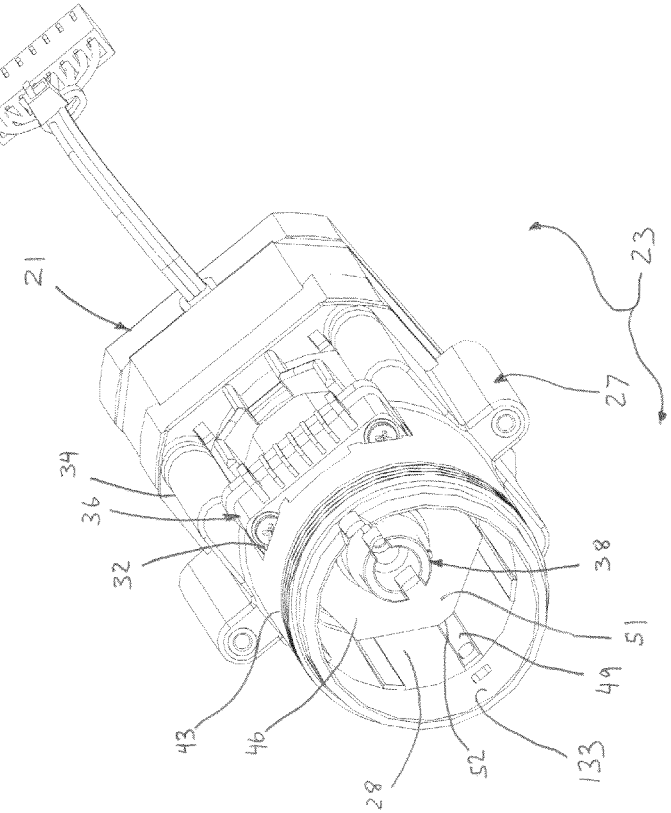

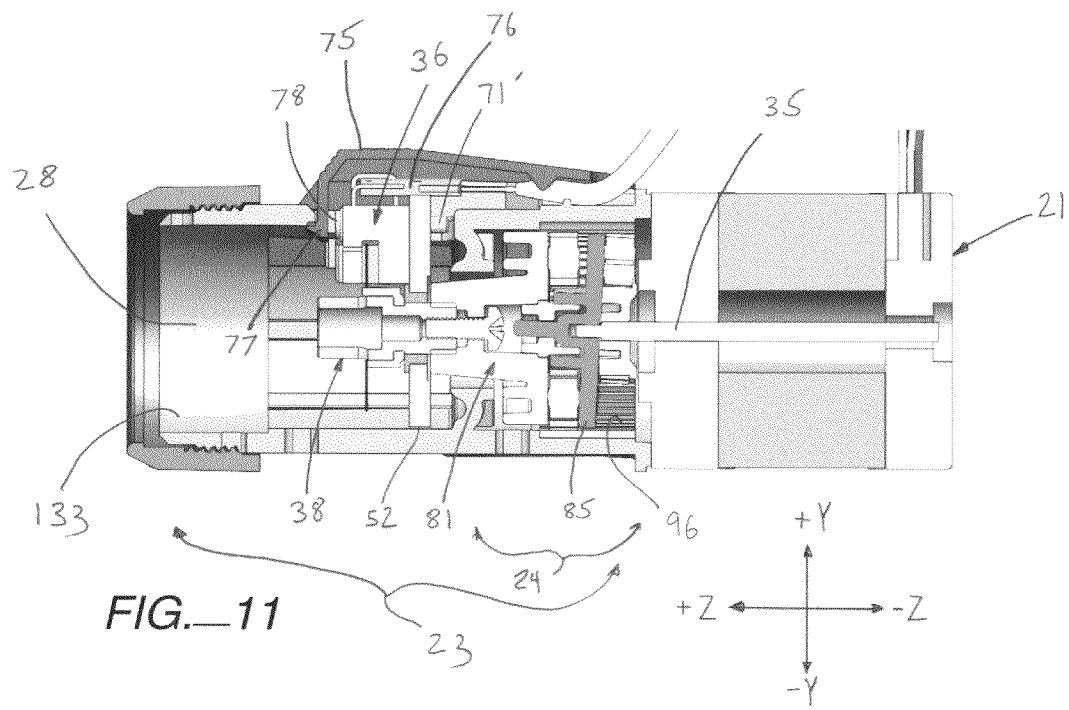
FIG._11
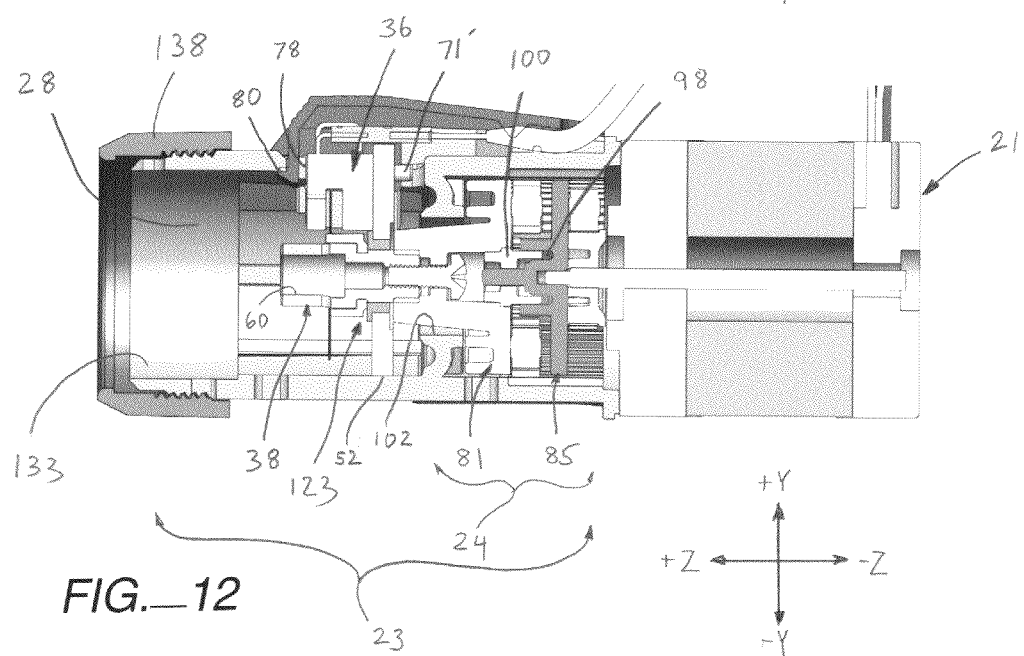
FIG._12

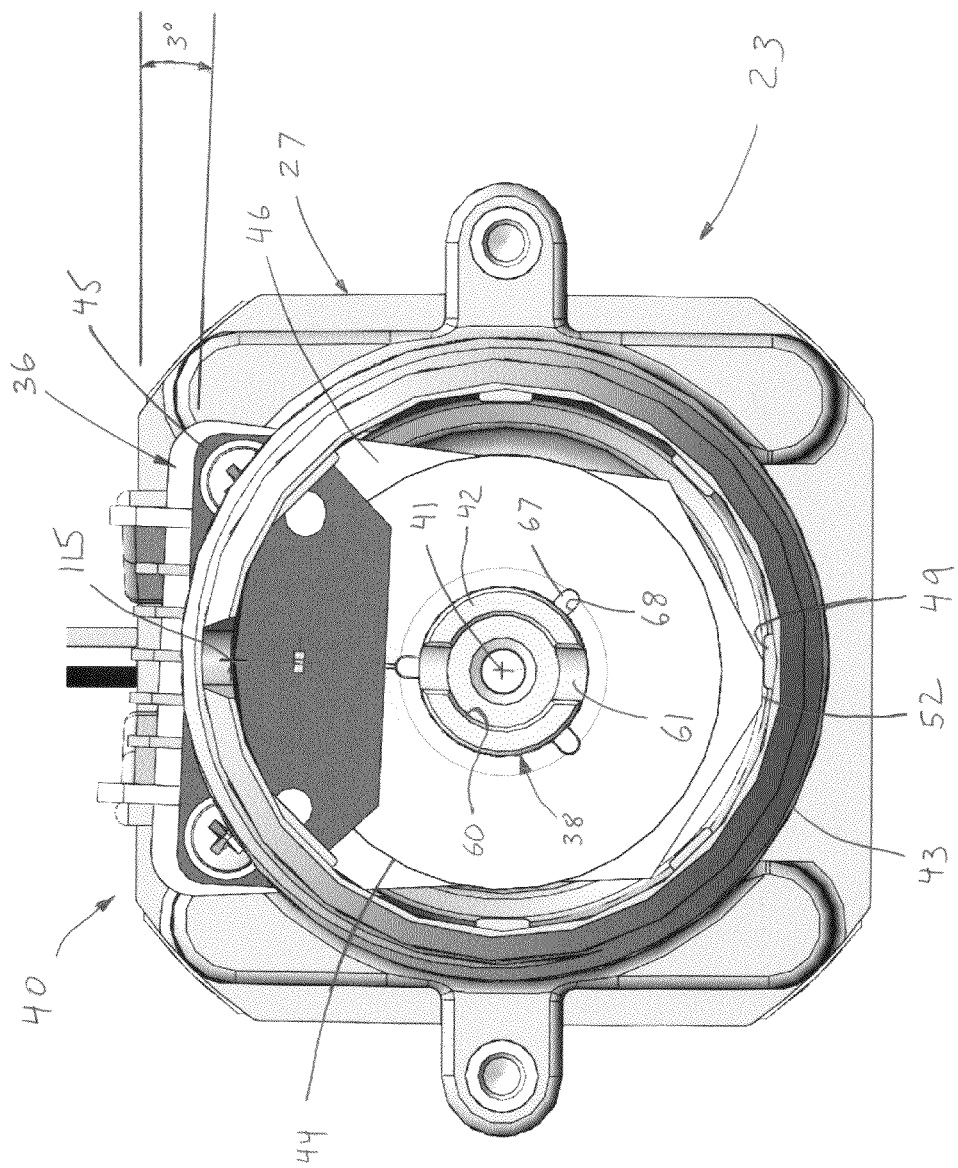
FIG._13

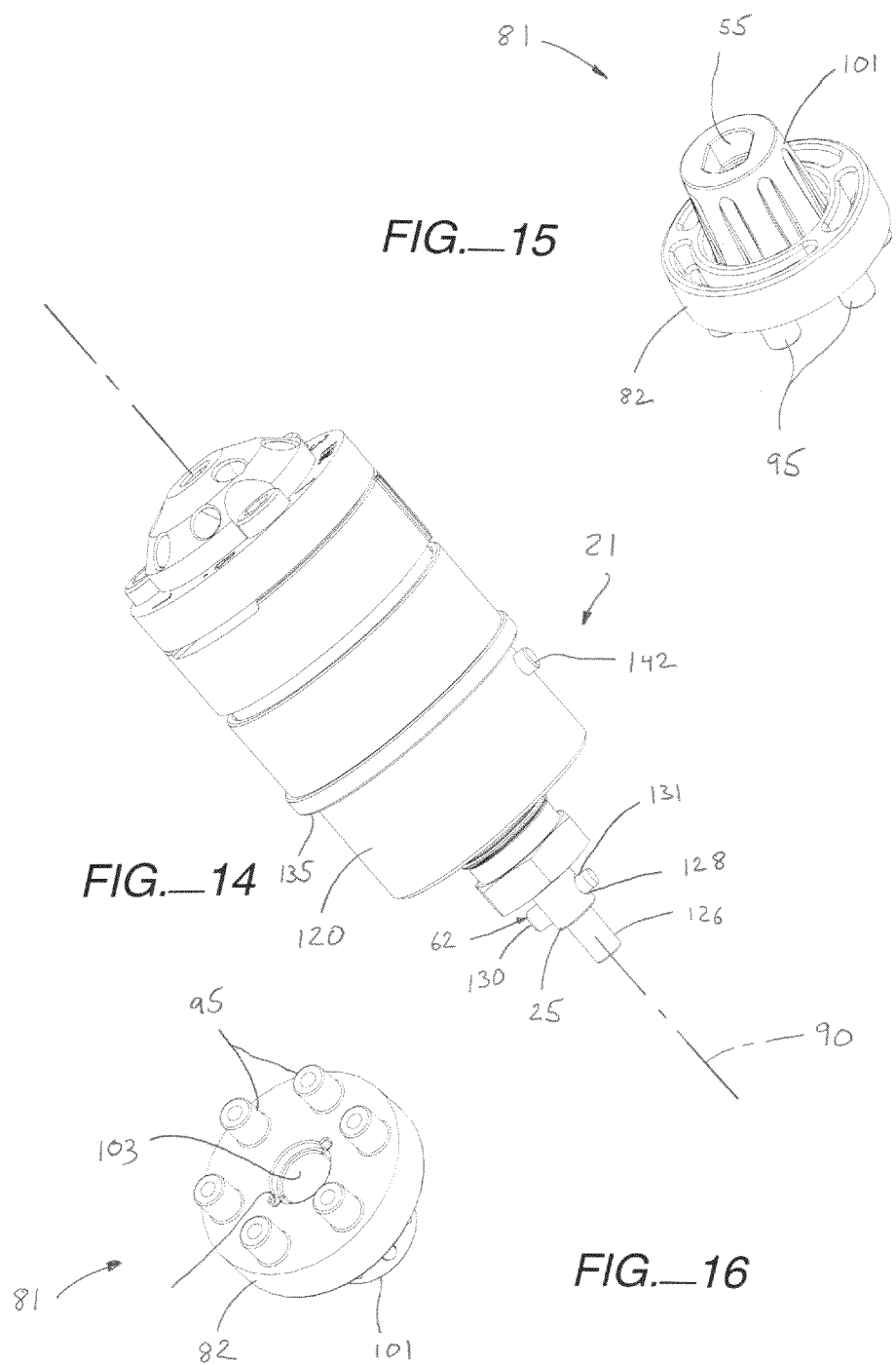

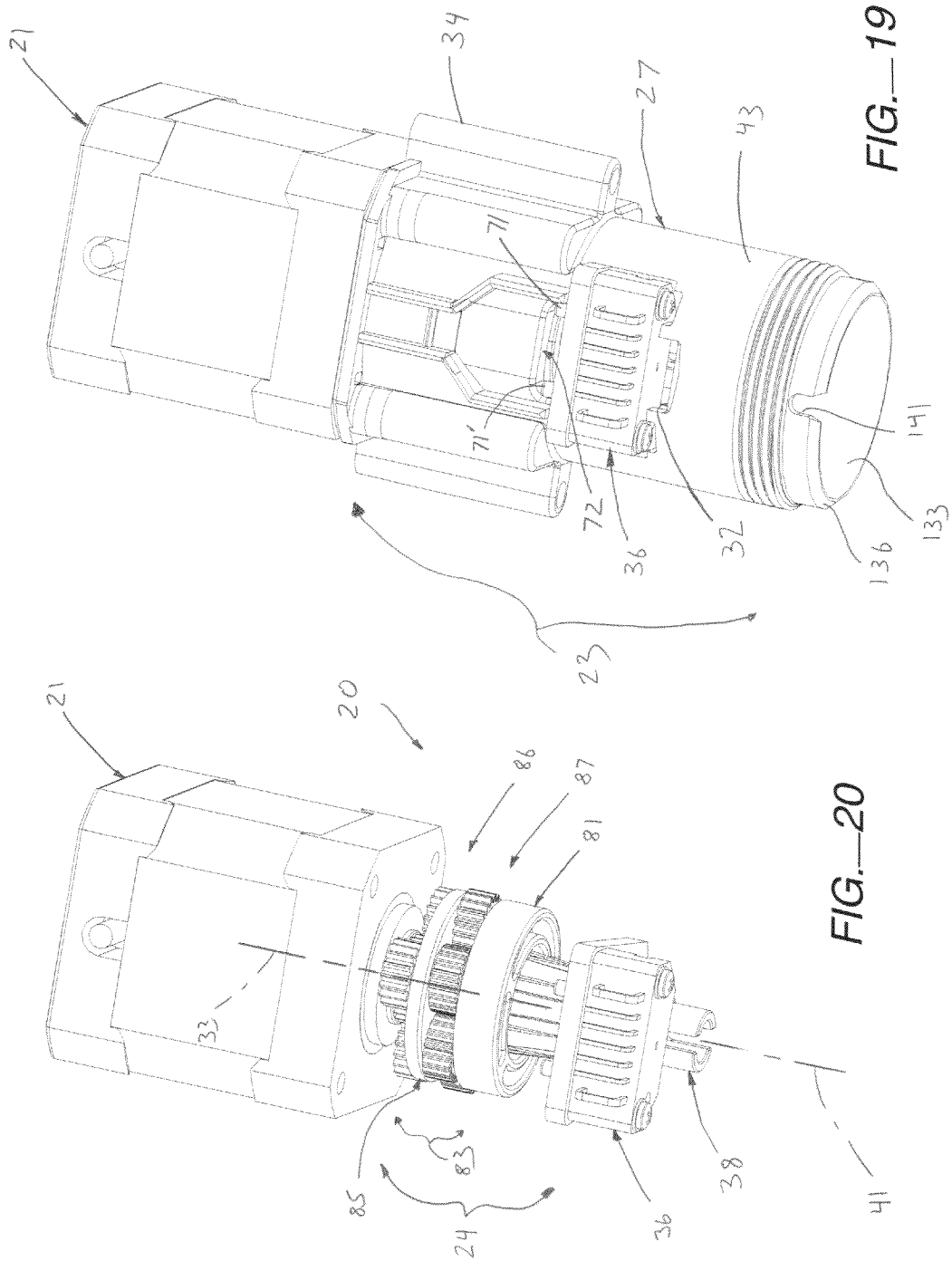

MULTI-POSITION MICRO-FLUIDIC VALVE SYSTEM WITH REMOVABLE ENCODER ASSEMBLY

FIELD OF THE INVENTION

The present invention relates to multi-position valves, and more particularly, relates to coupled drive multi-position valves for micro-fluidic distribution management.

BACKGROUND OF THE INVENTION

Dual and multi-position valves to inject, select or switch fluids are well established in scientific instrumentation. In particular, high pressure multiport or multi-position valves are applied in analytical processes, such as liquid chromatography. High pressure applications for micro-fluidic distribution management benefits from faster separations and increased through put. In order to accurately run these applications, positioning of the valve must be very precise. The more precise the positioning is, the lower the effects of dispersion will have on the analysis.

These high pressure micro-fluidic distribution management systems typically include a drive motor, the multi-position valve with a valve actuator assembly mounted between the drive motor and the multi-position valve. More recently, these multi-position valves assemblies incorporate internal encoder devices within a housing of the actuator assembly that are applied to determine the position of the multi-position valve.

The encoder device generally includes an encoder wheel coupled to a rotating shaft of the valve, and rotates around the shaft axis. The encoder device also includes an encoder module mounted to the actuator housing that cooperates with the encoder wheel to determine the rotational position of wheel relative to the shaft axis.

To properly operate these encoder devices, the positioning and the alignment between the encoder module and the encoder wheel is critical. For example, in some current designs, the angular relation of the encoder wheel and the shaft must be set during assembly, as any variation will cause variation in the valve's angular position. In other designs, it is imperative that the concentricity throughout the drive train of the valve is maintained within very tight tolerances. That is, all of the mating parts must be substantially aligned or the valve may bind up. This is especially important when installing the encoder wheel on the rotating shaft, and the encoder module to the actuator housing, as there is very little run out allowed for the parts to operate properly. If the encoder module is installed independently of the encoder wheel, it is very important that the shaft of the encoder wheel is mounted to be very tightly toleranced with respect to run-out and concentricity. Due to these tight tolerances, the cost of the actuator is higher and more difficult to assemble.

In still other designs, the encoder wheel is secured to the shaft with a set screw. Thus, it is possible in these designs that the set screw will "back off" and allow the encoder wheel to move relative to the shaft. This would cause the encoding to be incorrect and the valve would not position correctly.

Accordingly, there is a need for a multi-position micro-fluidic valve actuator system that simplifies installation of the encoder assembly during actuator assembly.

SUMMARY OF THE INVENTION

The present invention provides a micro-fluidic valve actuator assembly operably mounted between a drive motor and a multi-position micro-fluidic valve device. The valve device includes a valve shaft rotating about a valve axis thereof between a plurality of discrete fluid distribution positions. The actuator assembly includes an actuator housing having an exterior wall and an interior wall, the interior wall of which defines an interior through-chamber having a proximal portion, a distal portion and a chamber axis. The actuator assembly further includes a drive assembly rotatably positioned within the chamber proximate to the proximal portion. The drive assembly includes a drive axis of rotation positioned substantially co-axial with the chamber axis, and which has a proximal portion rotatably coupled to the drive motor. In accordance with the present invention, the actuator assembly further includes a stand alone encoder assembly having a support structure and an encoder shaft rotatably mounted to the support structure for rotation about an encoder shaft axis. An encoder wheel is mounted to the encoder shaft for rotation about the encoder shaft axis, and an encoder module mounted to the support structure. The encoder module cooperates with the encoder wheel, as a preset unit, to determine the rotational position of the encoder shaft about the encoder shaft axis. The support structure is configured for positioning within the housing at a mounting position, enabling rotational coupling of a proximal portion of the encoder shaft to a distal portion of the drive assembly, and enabling rotational coupling of a distal portion of the encoder shaft to a proximal portion of the valve shaft when the multi-position fluid valve device is mounted to the distal portion of the actuator housing. Through this proximal and distal coupling of the encoder shaft, the support structure is free of rigid coupling directly to the actuator housing, allowing the encoder assembly to "float" within the housing to accommodate any minute misalignments between the coupling components.

In one specific embodiment, the support structure is configured to cooperate with the housing, in the mounting position, to permit minute movement of the encoder assembly, relative to the housing, in three degrees of freedom. One degree of freedom, for example, includes minute movement in a direction substantially parallel to the chamber axis, minute movement in a direction substantially perpendicular to the chamber axis, and/or minute rotational movement substantially about an axis that is spaced apart from, but oriented substantially parallel to, the chamber axis.

In another embodiment, the exterior wall of the housing defines a side opening extending from the exterior wall into the interior through-chamber. The side opening is formed an dimensioned for insert receipt of the encoder assembly therein to the mounting position. The housing includes opposed alignment walls accessible from the housing side opening, and the support structure includes two spaced-apart dowel pins configured to slideably engage the opposed alignment walls when the encoder assembly is in the mounting position. Contact of the pins with the alignment wall substantially prevent displacement thereof in directions perpendicular to the alignment walls.

Another specific configuration includes a generally plate-shaped bracket member of the support structure that has a first bracket wall and an opposed second bracket wall. The bracket member further includes opposed side walls that extend between the first and second bracket walls, and that taper inwardly relative to one another toward an insert portion thereof. The insert portion is configured for initial insertion of the encoder assembly through the housing side opening to the mounting position.

In still another embodiment, the dowel pins extend outwardly from the first bracket wall, and the encoder module is mounted to the opposite side second bracket wall. In this embodiment, one degree of freedom includes minute movement in a direction substantially perpendicular to the encoder shaft axis. The insert portion of the bracket member includes an abutting end formed and dimensioned for abutting contact with the chamber interior wall, to limit the minute movement of the bracket member in the direction substantially perpendicular to the encoder shaft axis, when in the mounting position.

Yet another specific embodiment provides a drive assembly that includes a shaft carrier device, having a distal shaft portion configured to operably mount to the proximal portion of encoder shaft, a carrier platform, having a proximal portion configured to operably mount to the drive motor, and a gear train assembly, operably disposed between the carrier platform and the shaft carrier device for selective rotational speed control of the shaft carrier device about the drive axis.

In another aspect of the present invention, a multi-position micro-fluidic valve system is provided that is operably mounted to a drive motor. The valve system includes a housing having an exterior wall and an interior wall, the interior wall of which defines an interior through-chamber having a proximal portion, a distal portion and a chamber axis. A drive assembly is rotatably positioned within the chamber proximate to the proximal portion. The drive assembly includes a drive axis of rotation positioned substantially co-axial with the chamber axis, the drive axis of which includes a proximal portion rotatably coupled to the drive motor. A removable, stand alone, self contained encoder assembly is provided thae includes a support structure, an encoder shaft rotatably mounted to the support structure for rotation about an encoder shaft axis, and an encoder device. The encoder device is configured to determine the rotational position of the encoder shaft about the encoder shaft axis. The support structure is configured for positioning within the housing at a mounting position, enabling rotational coupling of a proximal portion of the encoder shaft to a distal portion of the drive assembly. The actuator assembly further includes a multi-position micro-fluidic valve device having a valve shaft rotating about a valve axis thereof between a plurality of discrete fluid distribution positions. The valve device is mountable to the distal portion of the housing in manner enabling rotational coupling of a proximal portion of the valve shaft to a distal portion of the encoder shaft when the encoder assembly is in the mounting position. Accordingly, in the mounting position, the support structure is free of rigid coupling directly to the actuator housing, although it cooperates with the housing to permit minute movement of the encoder assembly, relative to the housing, in three degrees of freedom.

In still another aspect of the present invention, a removable, stand alone, self contained encoder assembly is provided for a micro-fluidic valve actuator assembly operably mounted between a drive motor and a multi-position micro-fluidic valve device. The valve device includes a valve shaft rotating about a valve axis thereof between a plurality of discrete fluid distribution positions, and the actuator assembly includes a housing with an interior wall defining an interior through-chamber having a chamber axis. The actuator housing further defines a side opening extending into the interior through-chamber. The encoder assembly includes a relatively rigid bracket member having a first bracket wall and a generally opposed second bracket wall. The bracket member is sized and dimensioned for insertion through the housing side opening to a mounting position in the interior through-chamber. An encoder shaft is rotatably mounted to the bracket member such that a proximal portion thereof extends outwardly from the first bracket wall, and a distal portion of the encoder shaft extends outwardly from the second bracket wall. The encoder shaft is oriented relative to the bracket member such that an encoder shaft axis of rotation will be generally co-axial with the chamber axis when the encoder assembly is positioned substantially at the mounting position in the interior through-chamber of the actuator housing, enabling rotational coupling of the proximal portion of the encoder shaft to the drive motor, and enabling rotational coupling of the distal portion of the encoder shaft to the valve shaft when the multi-position fluid valve device, wherein the support structure is free of rigid coupling directly to the actuator housing. An encoder wheel is provided, mounted to the encoder shaft for rotation about the encoder shaft axis, which cooperates with an encoder module, mounted to the bracket member, as a preset unit, to determine the rotational position of the encoder shaft about the encoder shaft axis. The encoder assembly further includes an alignment device mounted to the bracket member in a manner cooperating with the actuator housing to facilitate guidance of the encoder assembly toward the mounting position when inserted through the housing side opening, and into the interior through-chamber.

BRIEF DESCRIPTION OF THE DRAWINGS

The assembly of the present invention has other objects and features of advantage which will be more readily apparent from the following description of the best mode of carrying out the invention and the appended claims, when taken in conjunction with the accompanying drawings, in which:

FIG. 1 is a top perspective view of a micro-fluidic valve system constructed in accordance with the present invention.

FIG. 2 is a complete exploded top perspective view of the micro-fluidic valve system of FIG. 1.

FIG. 3 is a side elevation view, in cross-section, of the micro-fluidic valve system of FIG. 1.

FIG. 4 is an enlarged side elevation view, in cross-section, of a housing and an encoder assembly of the actuator assembly of FIG. 1, showing the encoder assembly before positioning through a side opening in the actuator housing.

FIG. 5 is a side elevation view, in cross-section, of the actuator housing and the encoder assembly of the actuator assembly of FIG. 4, showing the encoder assembly in the mounting position in the actuator housing.

FIG. 6 is an enlarged top perspective view of the encoder assembly of FIG. 4.

FIG. 7 is another top perspective view of the encoder assembly of FIG. 6.

FIG. 8 is another top perspective view of the encoder assembly of FIG. 6 with the encoder wheel removed.

FIG. 9 is a bottom perspective view of the encoder assembly of FIG. 6.

FIG. 10 is a front perspective view of the micro-fluidic valve system of FIG. 1 with the valve device removed, and illustrating the encoder assembly in the mounting position.

FIG. 11 is an enlarged side elevation view, in cross-section, of the micro-fluidic valve system of FIG. 1, showing minute displacement of the encoder assembly along the Y-Y axis.

FIG. 12 is an enlarged side elevation view, in cross-section, of the micro-fluidic valve system of FIG. 1, showing minute displacement of the encoder assembly along the Z-Z axis.

FIG. 13 is an enlarged front elevation view of the micro-fluidic valve system of FIG. 1 with the valve device removed, and illustrating the minute rotational displacement of the encoder assembly about an axis of rotation.

FIG. 14 is an enlarged top perspective view of a valve device of the micro-fluidic valve system of FIG. 1.

FIG. 15 is an enlarged front perspective view of a shaft carrier device of a drive assembly of the micro-fluidic valve system of FIG. 1.

FIG. 16 is a rear perspective view of the shaft carrier device of FIG. 15.

FIG. 17 is an enlarged, top perspective view of the actuator housing of the micro-fluidic valve system of FIG. 1.

FIG. 19 is another enlarged top perspective view of the micro-fluidic valve system of FIG. 1 with the valve device removed.

FIG. 20 is a top perspective view of the micro-fluidic valve system of FIG. 19 with the actuator housing removed.

DETAILED DESCRIPTION OF THE INVENTION

Figure 18:
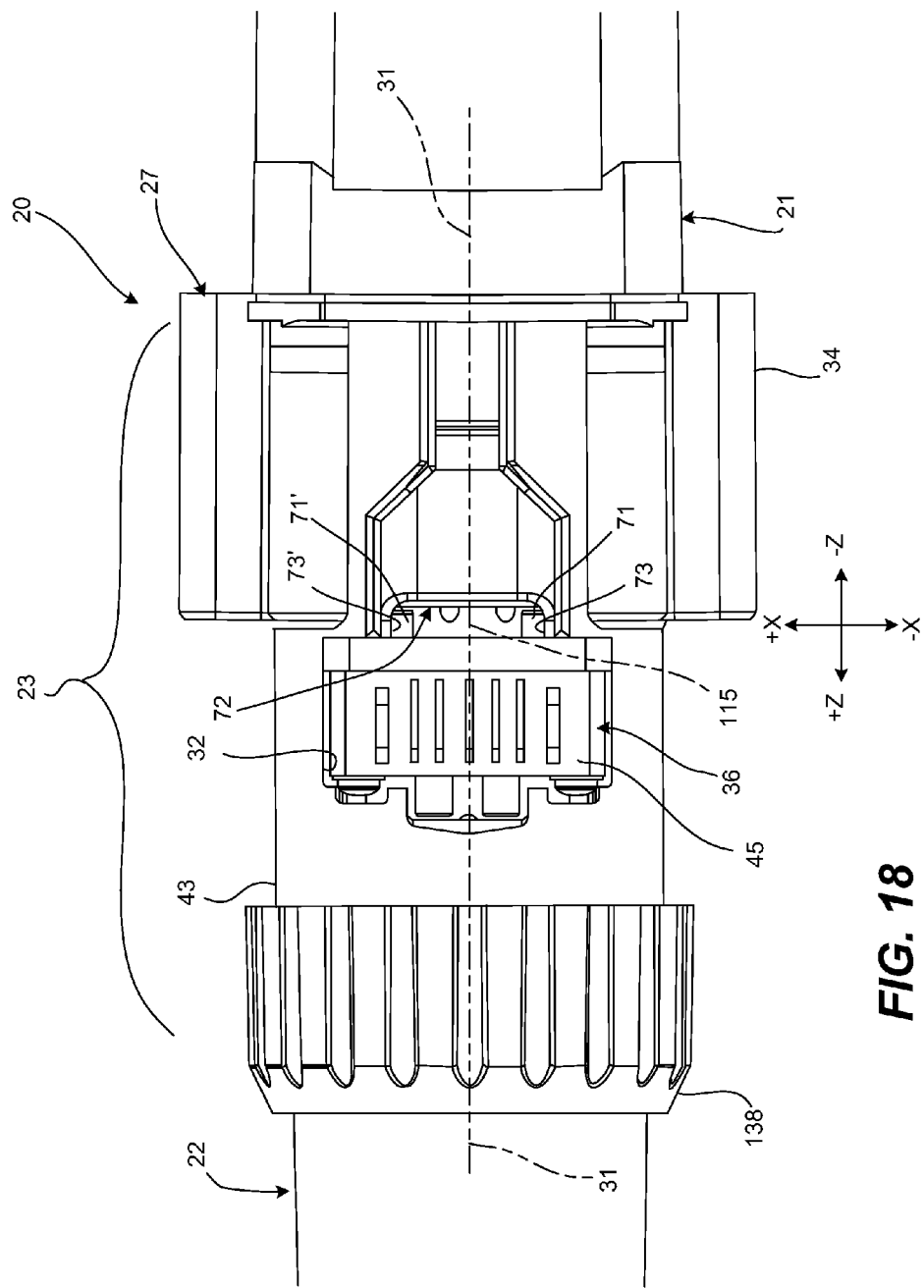
FIG. 18 is an enlarged top plan view of the actuator assembly of the micro-fluidic valve system of FIG. 1, showing insertion of the encoder assembly in the side opening of the actuator housing.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Referring now generally to FIGS. 1-5, a multi-position, micro-fluidic valve system, generally designated 20, is illustrated that is operably mounted to a drive motor device 21. The valve system 20 essentially includes a multi-position, micro-fluidic valve device 22 and a valve actuator assembly 23 coupling the valve device 22 to the drive motor device 21. The multi-position micro-fluidic valve device 22 includes a valve shaft 25 rotating about a valve axis 26 thereof between a plurality of discrete fluid distribution positions. The valve actuator assembly 23 includes a rigid housing 27 having an exterior wall and an interior wall. The interior wall defines an interior through-chamber 28 having a proximal portion, a distal portion and a longitudinally extending chamber axis 31. The actuator assembly 23 further includes a drive assembly 24 rotatably positioned within the interior through-chamber proximate to the housing proximal portion 34. The drive assembly 24 includes a drive axis 33 of rotation oriented and positioned substantially co-axial with the chamber axis 31. A proximal portion of drive axis 33 of the actuator assembly is drivably coupled to a distal portion of a motor shaft 35 of the drive motor device.

Preferably, the actuator assembly is configured for drop installation through a side opening 32 of the housing 27, from the housing exterior wall into the through-chamber 28 thereof, to the mounting position (FIG. 4). It will be appreciated, however, that the actuator assembly 23 may also be installed through a proximal end or a distal end of the housing through-chamber as well.

The actuator assembly further includes a standalone or insertable encoder assembly, generally designated 36, which includes a support structure 37, an encoder shaft 38 and an encoder device 40 (FIGS. 6-9). The encoder shaft 38 is rotatably mounted to the support structure 37 for rotation about an encoder shaft axis 41 of rotation. The encoder device 40 is configured to cooperate with the encoder shaft 38 to determine the rotational position of the encoder shaft 38 about the encoder shaft axis 41. Once the encoder device 40 is pre-aligned and pre-calibrated or aligned with the encoder shaft during assembly thereof, the entire encoder assembly 36 can be installed within the through-chamber 28 of the actuator housing 27, as a unit, to a mounting position (FIGS. 3, 5 and 10). When the encoder assembly is seated in the mounting position, a proximal portion 39 of the encoder shaft 38 can be rotationally coupled to a distal portion of the drive assembly 24. This seated position also enables a distal portion 42 of the encoder shaft 38 to be rotational coupled to a proximal portion of the valve shaft 25 of the multi-position, micro-fluidic valve device 22, when the valve is mounted to a distal portion 43 of the actuator housing 27. However, in accordance with the present invention, the support structure 37 is free of rigid coupling directly to actuator housing 27. In other words, the encoder assembly is in a sense "floating" within the through-chamber 28, enabling minute relative movement for aligned mounting between the drive assembly 24, the valve shaft 25 and the encoder shaft 38.

Accordingly, unlike the piecemeal assembly of the encoder device within the actuator housing of the current designs, the stand alone encoder assembly of the present invention enables pre-alignment and pre-calibration of the encoder device prior to installation in the actuator assembly. In one particular embodiment, for example and as shown in FIGS. 6-9, the encoder device 40 includes an encoder wheel 44 and an encoder module 45. The encoder wheel 44 is mounted to the encoder shaft 38 for rotation about the encoder shaft axis 41, while the encoder module is affixed to the support structure 37. In this manner, the encoder wheel 44 and the encoder module 45 can be aligned and calibrated, together as a unit, prior to mounting of the encoder assembly 36 in the actuator assembly 23. As previously mentioned, it is the alignment between the encoder wheel and the encoder module that is critical to proper operation of the encoder device. Since, the pre-aligned and pre-calibrated encoder assembly can be merely inserted or positioned into the actuator housing during assembly, assembly times of the valve actuators are significantly reduced, resulting in reduced assembly costs as well.

Another significant advantage of this design is that the encoder assembly 36, when in the mounting position (FIGS. 3, 5 and 10), enables minute movement or floating thereof as a unit, along three degrees of freedom (FIGS. 11-13, and as will be described in greater detail below), while maintaining operational coupling of the drive motor device 21 to the valve device 22. Accordingly, any minute misalignment between the coupling rotational components of the drive motor and the valve drive shaft will be absorbed by the minute displacement of the encoder assembly 36 along one or more of the three degrees of freedom thereof, relative to the actuator housing 27.

Referring back to FIGS. 6-9, the encoder assembly 36 is shown primarily comprising the support structure 37, the encoder shaft 38 and the encoder device 40. In one specific embodiment, the support structure 37 includes a generally plate-like bracket member 46 having a first bracket wall 47 on one side thereof, and an opposed second bracket wall 48 on an opposite side thereof. Although these bracket walls are illustrated as substantially parallel to one another, they need not be. The bracket member 46 is preferably composed of a relatively rigid material having a structural integrity sufficient to maintain the relative, aligned position between the encoder device components and the rotating encoder shaft 38 preset during assembly thereof. Suitable materials for the bracket member include metals and/or polymers, filled or unfilled.

This relatively thin bracket member 46 is also generally wedge-shaped to facilitate insertion thereof through the housing side opening 32, as well as to accommodate the rounded interior wall of the interior through-chamber 28, when the encoder assembly 36 is seated in the mounting position. As best viewed in FIGS. 6 and 8, the bracket member includes opposed side walls 50a, 50b, extending between the opposed first and second bracket walls 47, 48, that taper inwardly toward an apex or insert portion 51 of the encoder assembly 36. As will be detailed at a later time, this apex forms an abutting end 52 that is designed to contact a longitudinally extending contact rib 49 (FIGS. 3, 5 and 10) formed in the housing interior wall, and limit the minute movement of the encoder assembly along one degree of freedom (e.g., along the −Y direction).

With respect to the two opposed side walls 50a, 50b, a two tiered taper is incorporated having a rear tapered portion and a much steeper front tapered portion that terminates at the abutting end 52. It will be appreciated however, that the opposed side walls can be curvilinear as well.

Referring now to FIGS. 4, 5 and 7, it is shown that the encoder shaft 38 is rotatably supported by the support structure 37. In particular, the support structure 37 includes an encoder shaft bearing or bushing 53 press-fit into an aperture in the bracket member 46. Once the encoder shaft 38 is seated in the encoder shaft bearing 53, the encoder shaft is oriented such that an encoder shaft axis 41 is oriented substantially perpendicular to the bracket member 46 (e.g., substantially perpendicular to the substantially parallel first and second brackets walls). Moreover, as will be described below, the encoder shaft 38 is also disposed and oriented along the support structure such that when the encoder assembly is seated in the mounting position (FIG. 5) within the housing side opening 32, the encoder shaft axis 41 of rotation is positioned generally co-axial with the chamber axis 31.

A proximal portion 39 of the encoder shaft 38 extends proximally from the first bracket wall 47. In one particular embodiment, the encoder shaft proximal portion 39 is configured as a male-type connector formed for aligned receipt within a corresponding receiving socket 55 defined by the distal portion of the drive assembly 24. FIG. 9 best illustrates that in one particular embodiment, the encoder shaft proximal portion 39 is substantially cylindrical shaped, having at least one flat or key wall 56 for alignment thereof with the drive assembly.

Extending axially inward from a proximal end of the encoder shaft 38 is a threaded aperture 57. As will be described, this threaded aperture 57 is formed and dimensioned for threaded receipt of a drive fastener 58 selectively fastening the drive assembly 24 to the encoder shaft 38.

Regarding the opposite side of the encoder shaft 38, as shown in FIGS. 4, 7 and 8, the distal portion 42 extends distally from the second bracket wall 48. In one particular embodiment, the encoder shaft distal portion 42 is barrel-shaped, defining a receiving socket 60 that is formed and dimensioned for sliding axial receipt of the proximal portion of the valve shaft 25.

Extending transversely across the barrel-shaped distal portion 42 is an alignment slot 61. As will be described, this slot 61 is formed for sliding axial receipt of a pin member 62 of the valve device (FIGS. 3 and 14) that is disposed transversely across the proximal portion of the valve shaft 25. This pin is keyed so that one side is larger than the other. This allows the valve to only be installed and oriented one way.

As previously indicated, the encoder device 40 cooperates with the encoder shaft to determine the rotational position thereof about the encoder shaft axis 41. In turn, when the encoder shaft 38 is mounted to the valve shaft 25, the precise rotational switching position of the mounted valve device 22 can be determined. Through the precise determination of the switching position, the valve device 22 can be accurately actuated, via the stepped drive motor device 21 and the drive assembly 24, to a discrete one position of the plurality of positions thereof. Accordingly, regardless of which valve device 22 is mounted to the actuator assembly 23, by determining the position of that valve, it can be accurately controlled and positioned.

In one specific embodiment, the encoder device 40 includes one or more disk-shaped encoder wheels 43 (only one of which is illustrated) mounted to the rotating distal portion 42 of the encoder shaft 38 and an encoder module 45 mounted to the second bracket wall 48 of the bracket member. The module 45 includes a housing 63 and a PC sensor board 64 that supports one or more stationary optical sensors (not shown). The encoder wheel cooperates with these one or more optical sensors to determine the absolute rotational position and orientation of the encoder wheel, relative the drive axis 33.

In one embodiment, the housing 63 (and the encoder module 45) is mounted to a set of dowel pins (not shown), extending outwardly from the second bracket wall 64. The housing 63 includes receiving holes (not shown), formed for sliding receipt of the dowel pins, that are pre-aligned so that the encoder module 45 can be accurately positioned relative to the bracket member 46.

In one specific embodiment, the optical sensor is provided by an LED device capable of sensing or reading radially extending lines (not shown) on the encoder wheel. For instance, there may be four (4) lines for every 1° on the encoder wheel for a total of 1440 lines. Such an abundance of lines on the encoder wheels enables a much finer resolution and positioning accuracy to be attainable. Any combination of positions can thus be programmed, therefore only requiring one valve actuator regardless of how many positions the valve device may have. By way of example, one valve device 22 mounted to the valve actuator may be programmed for 2, 6 and/or 10 discreet positions, while another valve device may be programmed for 4 and 8 discreet positions.

In an alternative design, the encoder wheel 44 may contain a set of interior diameter windows and/or a set of outer diameter notches (not shown) that allows a light signal to be transmitted therethrough. In turn, the encoder PC sensor board 64 supports a pair of optical sensors (not shown) that straddle the respective rotating encoder wheel 44 in an orientation to determine whether or not a notch or window is sensed. The encoder wheel 44 works in conjunction with the optical sensors to absolutely locate the valve in discrete, equally spaced positions (e.g., 36° and/or 60° increments).

Using this approach multiple combinations are possible for the one or more encoder wheels. Accordingly, a valve device 22 ranging from having two discrete positions to having fifteen discrete positions can be controllably coupled to the actuator assembly for precise control and operation thereof. Such an application is detailed in our U.S. Pat. No. 7,201,185 to Poppe et al., entitled "COUPLED DRIVE MULTI-POSITION FLUID VALVE APPARATUS AND METHOD", herein incorporated by reference in its entirety.

As best illustrated in FIGS. 4, 7 and 8, in order to strategically position the encoder wheel 44 along the encoder shaft distal portion 42, a positioning collar 65 is disposed about the distal barrel portion 42 of the encoder shaft. The encoder wheel, thus, seats against a distal shoulder portion 66, axially spacing it a predetermined axial distance from the second bracket wall 48. In one particular embodiment, for example, the encoder wheel is spaced in the range of about 0.250 inches to about 0.260 inches from the bracket member 46.

The encoder wheel 44 and the positioning collar 65 cooperate to position the wheel relative in a discrete orientation relative to the encoder shaft 38 to assure proper mounting alignment. Preferably, the encoder wheel can only be aligned and installed on the encoder shaft 38 in one-way. In this manner, the chance of misinstallation (e.g., a backward installment) is eliminated. Moreover, the encoder wheel 44 and the positioning collar 65 cooperate to secure and permanently affix the encoder wheel to the encoder shaft 38, as well. In one embodiment, the positioning collar 65 includes a plurality of custom, non-symmetrically spaced-apart staking nubs or posts 67 upstanding from the distal shoulder portion 66. The encoder wheel 44, correspondingly, includes a plurality of corresponding slots 68 spaced-apart in a manner corresponding to the alignment of the collar staking nubs 67.

Once the encoder wheel 44 is properly oriented, the wheel 44 can be press-fit onto the custom spaced staking nubs. Using ultrasonic staking or welding, the encoder wheels can be adhered, mounted and fastened to the distal portion 42 of the encoder shaft 38. In effect, the nubs are deformed outwardly, mushrooming the heads of the staking nubs. This causes radial expansion of the nubs 67 radially outward to secure the expanded nubs against the walls of the receiving slots 68, and thus, affixing the relative axial distances between the encoder wheel and the bracket member. It will be appreciated, of course, that the encoder wheel 44 may be fastened or adhered to the encoder shaft 38 by applying many other mounting techniques as well.

By aligned mounting of the encoder module to the bracket member 46, in this specific embodiment, the primary components of the encoder device 40 (i.e., the encoder wheel 44 and the encoder module 45) can be pre-aligned and pre-calibrated during assembly of the encoder assembly 36. By comparison, the current applications require aligning and calibrating of these encoder components during assembly of the valve actuator assembly. Consequently, assembly of the actuator assembly of the present invention is significantly less complex, reducing assembly time and assembly cost.

Turning now to FIGS. 2 and 17, the actuator housing 27 is shown having a rectangular-shaped proximal portion 70 that mounts to the drive motor device 21, and a cylindrical-shaped distal barrel portion 43 that removably mounts to the valve device 22. The housing is generally provided by a shell structure that is preferably composed of a relatively rigid composite material designed for high strength, as will be described in greater detail below.

The interior wall of the housing 27 defines the central through-chamber 28 that extends axially through the housing from the proximal portion 34 to the distal barrel portion 43 along the longitudinally extending chamber axis 31. As best illustrated in FIG. 3, the drive assembly 24 is housed in the proximal portion 34 of the actuator housing 27 in a manner substantially co-axially aligning the drive axis with the chamber axis; the encoder assembly 36 is housed in a central portion of the actuator housing in a manner substantially co-axially aligning the encoder shaft axis 41 of rotation with the chamber axis; and the valve device is at least partially housed in the distal barrel portion 43 of actuator housing in a manner substantially co-axially aligning the valve axis 26 with the chamber axis 31.

In accordance with the present invention, the pre-assembled encoder assembly 36 is configured for drop installation of the encoder wheel 44 and encoder module 45, as a unit, through the side opening 32 of the actuator housing 27. Other methods of installing the encoder assembly exist, for example, the assembly can be installed from the front of the actuator assembly, or the actuator assembly can be built around the encoder assembly. As best shown in FIGS. 4, 5, 17 and 18, the encoder assembly 36 is positioned through the side opening 32 and into the through-chamber. Using the wedge-shaped insert portion 51 of the bracket member first, the encoder assembly 36 is inserted in a direction substantially perpendicular to the chamber axis 31 of the actuator housing, toward the mounting position.

To facilitate aligned seating of the encoder assembly, in the mounting position, the support structure 37 includes a pair of dowel pins 71, 71' extending proximally from the first bracket wall 47, in a direction substantially parallel to the encoder shaft axis 41. These dowel pins 71, 71' are positioned at a rear section of the bracket member 46, and are configured to cooperate with a U-shaped alignment wall 72 to properly position the bracket member 46, and thus the encoder assembly 36, in the mounting position. FIGS. 17 and 18 best illustrate that the alignment wall 72 includes a pair of outer opposed contact walls 73, 73' that are laterally spaced-apart by a distance substantially equal to the spacing between the outermost portions of the cylindrical dowel pins 71, 71', relative to one another.

The outer contact walls 73, 73' are positioned and oriented to slideably contact the opposed dowel pins 71, 71' in a manner guiding the encoder assembly toward the mounting position (FIGS. 3, 18 and 19). Each of these opposed contact walls 73, 73' are preferably contained substantially within corresponding contact planes that are oriented substantially parallel to one another. Moreover, these walls are further oriented substantially parallel to the chamber axis. It will be appreciated, of course, that the alignment wall 72, as well as the placement and positioning of the corresponding dowel pins 71, 71', can be alternatively shaped, as long as they cooperate to properly position and orient the encoder assembly within the actuator housing, and relative to the other pertinent components.

Moreover, it will be appreciated that the dowel pins 71, 71' may extend all the way through the bracket member 46, in a manner extending distally from the second bracket wall 64. The distal side of the dowel pins 71, 71' may double as the mounting dowel pins for the encoder module 45 mentioned above.

To further orient the bracket member 46 in the mounting position, the insert portion 51 of the bracket member 46 includes an abutting end 52 formed and dimensioned for abutting contact with the chamber interior wall. As will be described in greater detail below, this abutting contact limits the minute displacement of the bracket member in a −Y-direction (FIGS. 3 and 5), which is substantially perpendicular to the chamber axis 31, when in the mounting position.

A removable PCB cover 75 is included that covers the backside of the PC sensor board 64 and connector 76 for protection thereof. Using a set of feet 77 on the PCB cover that is received in corresponding slots 78 in the housing, the PCB cover 75 is designed to only be removed when the valve device 22 is not mounted to the actuator assembly 23. Each foot 77 includes an end tab 80 that is only accessible through the distal through-chamber opening of the distal barrel portion when the valve device 22 is not mounted to the actuator housing 27 (FIGS. 11 and 12).

Figure 21:
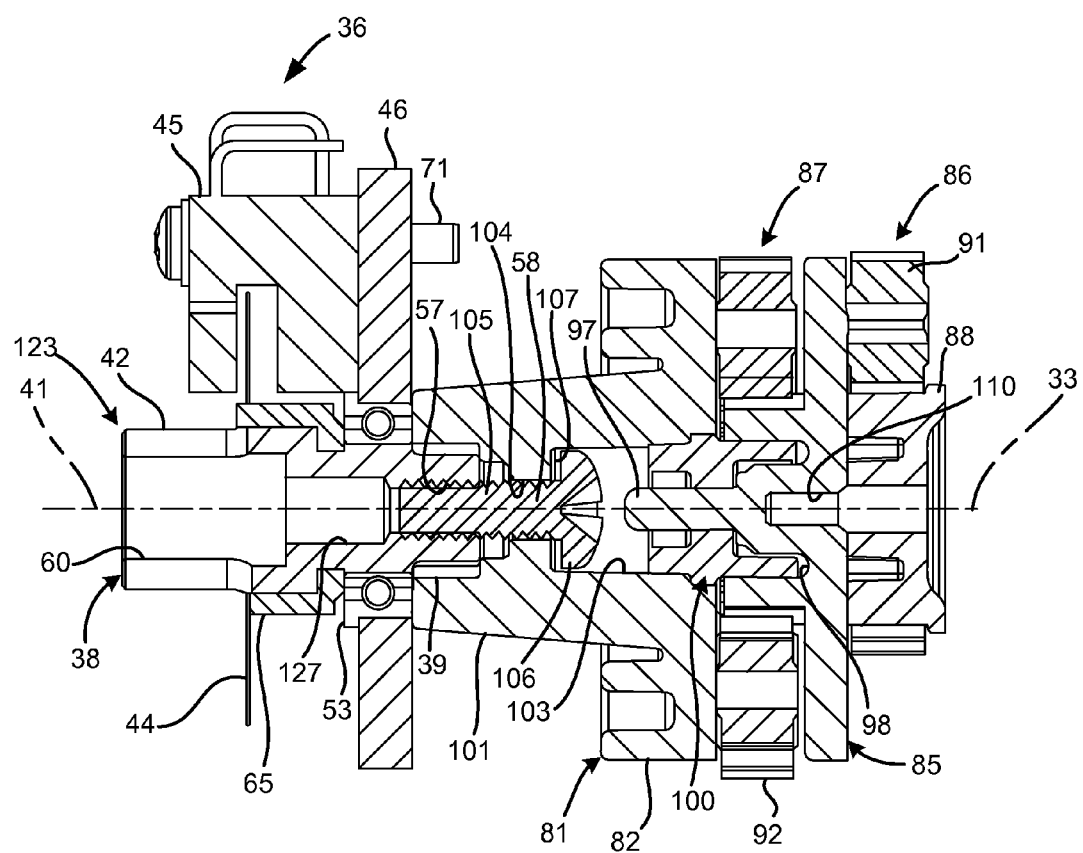
FIG. 21 is an enlarged, side elevation view, in cross-section, of the encoder assembly and the drive assembly, mounted together as a unit.

Referring now to FIGS. 2, 20 and 21, the drive assembly 24 is shown including a collective drive shaft which, in this configuration, is actually a compilation of axially disposed components consisting primarily of: a shaft carrier device 81 having a proximally positioned, disk-shaped, gear carrier platform 82; a gear train assembly 83; and a disk-shaped intermediary carrier platform 85. The intermediary carrier platform 85 is positioned at the proximal portion of the drive assembly 24 while the shaft carrier device 81 is position at distal portion of the drive assembly 24. Although the intermediary carrier platform 85 and the shaft carrier device 81 are co-axially aligned along the drive shaft axis 33 of rotation, and axially supported relative to one another, it is the gear train assembly 83 that provides the relative rotational coupling to one another, as will be better described below. Thus, when the drive assembly 24 is assembled in the housing 27, the motor shaft 35 of the drive motor is rotationally mated with the intermediary carrier platform 85, which in turn rotationally communicates with the gear train assembly 83. In turn, the gear train assembly 83 rotationally communicates with the shaft carrier device 81, via the gear carrier platform 82, which in turn, mates with the encoder shaft 38 when the encoder assembly placed in the mounting position in the actuator 27.

In one embodiment, the gear train assembly 83 includes at least one gear reduction drive 86 which in turn is coupled to the motor shaft 35 of the drive motor device 21. Depending upon the speed of the drive motor and/or the desired rotational actuation speed of the valve device, a single reduction gear train may be sufficient. In other embodiments where a high torque, lower-speed drive motor device 21 is employed, a second gear reduction drive reduction drive 87 may be placed in series with the first gear reduction drive 86. By way of example, the drive motor may be provided by a stepped, electric motor such as those manufactured by Lin Engineering of 1990 Russell Avenue Santa Clara, Calif. 95054, part #4118L-03E-06RO.

Whether a one-gear reduction drive or a two-gear reduction drive (as illustrated) is employed, each reduction drive essentially functions in the same conventional manner. Briefly, each reduction drive 86, 87 includes a respective pinion gear 88, 89 surrounded by a set of planetary gears 91, 92. Each planetary gear is rotatably mounted to respective posts 93, 95 of the gear carrier platform 82 and the intermediary carrier platform 85 (FIGS. 2, 16 and 21), respectively. Similarly, each carrier platform is suspended and supported in the actuator housing by the planetary gears in a manner rotating them about the drive shaft axis 33. As best viewed in FIG. 3, for example, each planetary gear 91, 92 is oriented to engage the teeth of the respective pinion or sun gear 88, 89 and the teeth of an internal ring gear 96 that is integrated into the interior wall of the housing near the proximal portion thereof.

Accordingly, as the motor shaft 35 and motor pinion gear 88 rotates about a motor shaft axis 90, the planetary gears 91 of the first reduction drive 86 are caused to rotate about their respective posts 93, via motor pinion gear 88, which in turn causes rotation of the intermediary carrier platform 85 about the drive axis. In turn, this causes the second pinion gear 89, fixedly mounted to the intermediary carrier platform 85, to rotate. Similar to the first reduction drive 86, the planetary gears 92 of the second reduction drive 87 are caused to rotate about their respective posts, via the second pinion gear 89, which in turn causes rotation of the gear carrier platform 82 about the drive axis 33. Collectively, these gear trains reductions cooperate to actuate the mounted valve device at the desired speed.

Turning now to FIGS. 2 and 21, the intermediary carrier platform 85 is generally disk-shaped having a stepped central alignment post 97 extending distally therefrom. In one specific embodiment, integrally formed annularly around the alignment post 97, and upstanding from the intermediary carrier platform 85 is the second pinion gear 89. It will be appreciated, however, that the second pinion gear could be separate from, but mounted to the carrier platform as well.

An annular receiving slot 98, extending around the drive axis 33, is also formed between the alignment post 97 and the second pinion gear 89. This slot 98, as will be described, is formed and dimensioned for sliding axial receipt and rotating support of a proximal portion of a carrier plug 100. This plug 100 provides cooperative axial support between the shaft carrier device 81 and the intermediary carrier platform 85 when coupled together during assembly to facilitate axial alignment therebetween.

The shaft carrier device 81 (FIGS. 15 and 16), on the other hand, includes the disk-shaped gear carrier platform 82 at a proximal portion thereof. Extending proximally from the gear carrier platform 82 on one side thereof is the plurality of planetary gear mounting posts 95, equally spaced about the drive axis. On an opposite side of the carrier platform, extending distally therefrom, is an elongated, central shaft carrier 101 that tapers gradually inward from a proximal portion thereof to the distal end thereof.

Briefly, when the drive assembly 24 is assembled, the intermediary carrier platform 85 essentially comprises the proximal portion of the drive assembly while the shaft carrier device 81 essentially comprises the distal portion thereof. The proximal portion of the drive assembly 24 (i.e., the intermediary carrier platform 85) can then be easily coupled to the distal portion of the motor shaft 35.

Turning now to FIGS. 3 and 5, once the encoder assembly 36 is positioned through the housing side opening 32, and is seated in the mounting position, the shaft carrier device may be releasably coupled to the proximal portion of the encoder shaft 38. This is initially performed by positioning the distal portion of the shaft carrier 101 through a central passage defined by an annular wall section 102 of the interior wall of the actuator housing 27.

In one particular embodiment, the distal end of the shaft carrier 101 defines an opening into the receiving socket 55 that is formed and dimensioned for sliding axial receipt of the keyed proximal portion 39 of the encoder shaft. FIGS. 9 and 15 best illustrate that the transverse cross-sectional dimension of the receiving socket 55 is substantially similar to, albeit slightly larger than, that of the proximal portion 39 of the encoder shaft 38. Accordingly, once the encoder shaft proximal portion 39 is axially received in the receiving socket 55, the rotational motion of the drive assembly about the drive axis 33 is translated to the encoder shaft 38.

In one specific embodiment, to secure the shaft carrier 101 to the encoder shaft, a fastener 58 is applied that is threadably received in the threaded aperture 57 at the proximal end of the encoder shaft 38 (FIG. 21). The fastener is preferably provided by a conventional threaded screw or the like that is positioned into an axially extending plug receiving socket 103 extending axially inward from a proximal end of the shaft carrier device 81. A communication passage 104 extends from the plug receiving socket 103 to the encoder shaft receiving socket 55. This passage 104 is configured for axial sliding receipt of a fastener shaft 105 of the fastener 58, having a diameter smaller in dimension than that of both the carrier plug receiving socket 103 and the encoder shaft receiving socket 55.

When the proximal portion 39 of the encoder shaft 38 is axially received in the receiving socket 55 of the shaft carrier, the fastener 58 can be inserted through the communication passage 104, via the opening of the plug receiving socket 103. As the fastener shaft 105 is threadably received in the threaded aperture 57 at the proximal end of the encoder shaft 38, a head portion 106 of the fastener 58 axially contacts a distal shoulder 107 formed at the distal end of the plug receiving socket 103, threadably securing the shaft carrier device 81 to the encoder shaft 38.

Once the encoder assembly 36 is secured to the shaft carrier device 81, the remaining portions of the gear train assembly 83 can be assembled (i.e., the planetary gears 91, 92, the pinion gears 88, 89 and the intermediation gear platform). To facilitate centering of the drive assembly components about the drive axis 33, when assembled, both the motor shaft 35 and intermediary carrier platform 85 mate with the adjacent gear carrier platform 82. FIGS. 3 and 21 best shows that the motor shaft 35 includes a distal finger portion 108 that is sized to slideably insert into, and rotate within, an axial slot 110 of the intermediary carrier platform 85. Thus, although the distal finger portion 108 rotates within the axial slot 110 of the intermediary carrier platform 85 as the motor shaft 35 and pinion gear 88 rotate, the rotational support therebetween function to provide partial axial alignment with the drive axis 33 of rotation.

With respect to the rotational support, and the axial alignment and coupling between the intermediary carrier platform 85 and the gear carrier platform 82, as mentioned, the carrier plug 100 is applied therebetween. Thus, similar to the relationship between the annular receiving slot 98 of the intermediary carrier platform 85 and the proximal portion of the carrier plug 100, the transverse cross-sectional dimension of the plug receiving socket 103 of the shaft carrier device 81 is substantially similar, albeit slightly larger than, that of the distal portion of the carrier plug 100 to enable snug sliding receipt therein. Accordingly, once nested together in a mounted relation, the drive train assembly rotates these drive assembly components in an aligned manner about the drive axis 33.

Depending upon the gear reduction ratio of the gear train assembly, the shaft carrier device 81 and the intermediary carrier platform 85 rotational speeds about their respective rotational axes will differ. In turn, the carrier plug 100 will be caused to rotate within at least one or both of the plug receiving socket 103 of the shaft carrier device 81 and the annular receiving slot 98 of the intermediary carrier platform 85. Thus, the carrier plug will require bearing support for one or both of the carrier platforms.

In one specific embodiment, the carrier plug 100 is configured to be rotationally stationary relative to the shaft carrier device 81, while rotating within the annular receiving slot 98 of the intermediary carrier platform 85. This is beneficial in that the gears are centered and aligned with other internal, mating components.

To rotationally affix the carrier plug 100 relative to the shaft carrier 101 so that the two components rotate about their respective axes of rotation, as a single unit, the distal portion of the carrier plug 100 includes a pair of opposed, axially extending ribs or key portions 112. To accommodate the carrier plug key portions 112, the cylindrical walls defining the plug receiving socket 103 of the shaft carrier device 81 define a pair of corresponding, axially extending key slots 113 sized and dimensioned for sliding receipt of the keys therein as the carrier plug is received in the receiving socket 103.

When the components of the micro-fluidic valve system 20 are properly aligned, as shown in FIG. 3, the drive shaft axis 33, the encoder shaft axis 41 and the valve shaft axis will all be oriented substantially co-axial with one another, as well as substantially co-axial with the chamber axis 31. In accordance with the present invention, however, the micro-fluidic valve system 20 of the present invention enables minute movement or floating of the encoder assembly, as a unit, along three degrees of freedom (FIGS. 11-13) within the actuator housing, while maintaining operational coupling of the drive assembly 24 to the valve shaft 25.

Accordingly, minute misalignments between the proximal portion 39 of the encoder shaft 38 and the drive assembly 24, as well as between the distal portion 42 of the encoder shaft and the valve shaft 25, will be accommodated by minute displacement of the encoder assembly 36 along one or more of the three degrees of freedom. Since the encoder wheel 44 and the encoder module 45 of the encoder assembly 36 were pre-calibrated and pre-aligned prior to assembly in the actuator housing, thus, any minute misalignments above mentioned will not affect the functionality of the encoder device 40.

Aligned contact between the dowel pins 71, 71' and the contact walls 73, 73' of the actuator housing 27 prevent or restrain displacement of the encoder assembly, as a unit, along the X-X direction. As shown in FIG. 18, the X-X direction is perpendicular to the Z-Z direction, which extends in the direction of the chamber axis 31. Moreover, the parallel planes that substantially contain the two contact walls 73, 73' are oriented to be substantially perpendicular to the X-X direction as well as substantially parallel to the Z-Z direction. These opposed contact walls 73, 73', accordingly, substantially prevent displacement of the dowel pins 71, 71', and thus the encoder assembly 36 as a unit, along the X-X direction.

It will be appreciated, however, that the opposed alignment walls do not prevent minute displacement of each dowel pins 71, 71' in the +Z direction (FIGS. 12 and 18), in the Y direction (FIG. 11), or do not prevent minute rotation of the encoder assembly 36 about a rotational axis 115 as the dowel pins 71, 71' minutely displace along the Y-Y direction in un-equal lengths (FIGS. 13 and 18). Collectively, these movements account for the present inventions three degrees of minute (approximately) displacement of the encoder assembly 36 within the actuator housing in the mounting position.

More particularly, referring back to FIG. 11, the first degree of freedom is the minute displacement of the encoder assembly 36, as a unit, along the Y-Y direction. As mentioned, this direction is oriented to substantially coincide with the direction of insertion of the encoder assembly 36 into, and through the side opening 32 (FIGS. 4 and 5). In accordance with the present invention, for instance, that a minute misalignment, in the Y-Y direction (FIG. 11), between the motor shaft axis 90 of rotation of the motor shaft 35 (although not shown) and the valve shaft axis 26 of rotation of the valve device 22 is accommodated by displacement of the encoder assembly 36 in the +Y direction, as well as minute rotation of the intermediary carrier platform 85 about an axis extending through and perpendicular to the distal finger portion 108 of the motor shaft 35 in the X-X direction. Collectively, comparing FIG. 3 with FIG. 11 and in accordance with the present invention, these minute misalignments can be accommodated by displacements of the bracket member 46 in the +Y direction, from the mounting position. In one specific embodiment, the range of displacement of the abutting end 52 with the contact rib 49 of the actuator housing is in the range of at least about 0.013"-0.014" in the +Y direction from the precise orientation shown in FIG. 3.

FIG. 12 best shows movement of the encoder assembly along a second degree of freedom along the Z-Z direction, which is parallel to the chamber axis 31 of the actuator housing. Again, a minute misalignment, in the Z-Z direction, between the motor shaft 35 (although again not shown) and the valve shaft 25 is absorbed by the separation of the drive assembly components. In one particular embodiment, the carrier shaft device 81 can separate from the intermediary carrier platform 85 along the Z-Z direction, as the proximal portion of the carrier plug 100 moves distally from the annular receiving slot 98 of the intermediary carrier platform 85. Collectively, this arrangement enables the encoder assembly 36 to minutely displace, in the +Z direction, in the range of at least about 0.040"-0.041" shown in FIG. 3.

Referring now to FIGS. 13 and 18, the third degree of freedom is the result of the collective rotation of the encoder assembly 36 about rotational axis 115 (which extends substantially in the Z-Z direction) as the dowel pins 71, 71' minutely displace along the corresponding contact walls 73, 73', in +Y direction from the mounting position, in un-equal lengths (FIGS. 13 and 18). The resulting rotation of the encoder assembly 36 is about the rotational axis 115 that extends in a direction substantially parallel to the chamber axis 31, and is oriented substantially at the bisecting point between the corresponding longitudinal axes of the dowel pins 71, 71'. Collectively, as shown in FIG. 13, this arrangement enables the encoder assembly 36 to minutely rotatably displace, about axis 115, in the range of at least about ±3°.

In accordance with the present invention, the micro-fluidic valve system 20 also enables one or more multi-position valve devices 22 to be removably mounted to a single actuator assembly 23 each of which function as entirely different reconfigured liquid end systems. For example, a six-position micro-fluidic valve system may be reconfigured into a ten-position micro-fluidic valve system or even a fifteen-position micro-fluidic valve system, which is operated and controlled by the same actuator assembly. While up to 96-position valves may be used, no more than up to 24-position valves are generally practical. As will be described in greater detail below, once the selected valve is aligned and mounted to the actuator assembly, and once the valve device is identified, the encoder assembly 36 can be reprogrammed to operate the selected valve device. The reconfigured valve system, thus, can be operated to control more than one type of multi-position micro-fluidic valves.

The valve device 22 may be provided by conventional high pressure, multiport or multi-position valves applied in analytical processes, such as liquid chromatography. Conventional shear face valves, such as the Rheodyne TitanHT or TitanHTE valve, Model No. 7770-262. As shown in FIG. 14, these valve devices 22 typically include a cylindrical shaped housing body 120 that contains the multi-position valve components therein. Briefly, the valve components typically include a rotor device 121 and a stator device 122 in fluid-tight contact at an interface plane therebetween (FIG. 3). Briefly, the rotor device 121 is rotatably mounted to the valve shaft 25 about the valve axis 26 of rotation, and contains a rotor face defining one or more fluid channels. As the rotor face is controllably rotated about the valve axis 26, via the stepped motor device 21, the one or more fluid channels contained in the face of the rotor device are caused to function as a communication duct or passage between a plurality of fluid ports contained along a stator face of the stator device. In other words, as the rotor face channel is aligned with the corresponding fluid ports on the stator face, fluid communication is enabled between the corresponding fluid ports, via the rotor face channel.

Accordingly, by aligning and mounting the selected valve device 22 to the actuator assembly 23 through a coupling device 123, the switch positioning of the valve device 22 can be precisely controlled through a control unit (not shown) disposed between the encoder assembly 36 and the stepped drive motor device 21. In essence, this configuration enables precision operation and positioning of the encoder shaft 38, via the encoder wheel 44. Hence by determining which multi-position valve device 22 (e.g., a six position, eight position or ten position valve) is properly aligned and seated in the actuator housing 27, the control unit can be programmed and operated to correspond to that detected valve so that precision operation for any valve can be realized.

As mentioned, to removably couple the valve device shaft to the actuator assembly shaft, the coupling device 123 is employed that enables the transfer of torque between the substantially co-axially aligned shafts. Thus, rotation of the collective drive shaft of the drive actuator 24 imparts rotation of the valve shaft 25 about the valve axis 26. In one specific embodiment, the coupling device 123 includes a barrel section 125 of the distal portion 42 of the encoder shaft 38 that defines the substantially cylindrical receiving socket 60 formed and dimensioned for sliding axial receipt of the proximal portion of the valve shaft 25 therein.

To further facilitate co-axial alignment, FIGS. 3 and 14 best illustrates that the valve shaft 25 also includes a distal nipple portion 126 that protrudes axially therefrom. To accommodate this nipple portion 126, the receiving socket 60 further includes a longitudinal hollow 127 formed and dimensioned for sliding receipt of the corresponding nipple portion 126 therein. In a similar manner, during intercoupling between the components of the coupling device 123, the transverse cross-sectional dimension of the receiving socket 60, formed in the distal barrel portion 42 of the shaft carrier device 81, is also formed and dimensioned for sliding receipt of the coupling device therein.

During the coupling operation of the valve device 22 to the actuator assembly, it is imperative to properly align the coupling device 123 relative the encoder wheel 44. This alignment is performed by providing the pin member 62 that is press-fit and disposed in a passage 128 extending transversely through the valve shaft 25. At one end of the pin member 62 is a head portion 130, which is wider in diameter than the shaft portion 131 of the pin member, and thus, prevents passage of the pin member all the way through the passage 128.

To accommodate the transversely disposed pin member 62, as described, the corresponding transverse alignment slot 61 extends the barrel section 125 of the distal portion 42 of the shaft carrier device 81. One side of the transverse alignment slot 61 is slightly wider than that of the other side, one side of which receives pin member head portion 130 and the other of which receives the shaft portion therein. Therefore, the proximal portion of the valve shaft 25 can only be aligned and coupled to the shaft carrier device 81 in one orientation.

Accordingly, when coupling a selected valve device 22 to the actuator assembly 23, the coupling device 123 is properly aligned and oriented relative the encoder shaft 38. During component engagement, the proximal tip of the valve shaft 25 is axially inserted into the receiving socket 60 of the barrel portion 42 of the encoder shaft 38 as the valve device 22 is moved axially toward the encoder shaft 38 of the actuator assembly 23. As axial advancement of the valve device toward the actuator housing continues, the nipple portion 126 of the valve shaft 25 is slideably received in the receiving hollow 127 (FIG. 3) of the distal barrel section. Simultaneously, the transversely disposed pin member 62 is slideably received in the transverse alignment slot 61. In this arrangement, thus, once the valve shaft 25 is mated to the encoder shaft 38, via the coupling device 123, the encoder shaft axis 41 and the valve axis 26, respectively, are oriented substantially co-axial one another, and generally with the chamber axis. Moreover, the coupling device 123 also provides a very high torsional rigidity so that the valve shaft 25 and the encoder shaft 38 effectively function as a single unit.

Once the valve shaft 25 is mated with the encoder shaft 38, the valve device 22 must be secured to the actuator assembly to prevent relative rotation therebetween during operation. To secure the valve device, it is removably affixed to the housing 27 of the actuator assembly 23. In one specific configuration, at least a proximal portion of a cylindrical-shaped body 132 of the valve device 22 is received in a distal opening (FIGS. 3 and 17) into the through-chamber 28 of the distal barrel portion 43 of the actuator housing 27. This arrangement further offers lateral support between the valve body 132 and the actuator housing 27 so that any lateral forces acting on either component will not be transmitted to the coupling device or the rotating shafts.

As the components of the coupling device 123 interengage, the proximal portion of the valve body 132 is simultaneously slideably received through the barrel portion distal opening 133 into the through-chamber 28 of the actuator housing 27. A proximal facing annular shoulder 135 of the valve body 132 protrudes radially outward therefrom which functions to abut against an annular rim 136 of the housing barrel portion 43 to limit receipt therein. This fitment also coincides, longitudinally, with the interengagement with the coupling device components with the collective drive shaft components.

To completely secure the valve body to the actuator housing, a spanner nut 138 is employed that threadably mounts to the outer sidewall of the annular rim 136. As the threads of the spanner nut 138 mate with the corresponding threads of the annular rim 136, a lip portion of the spanner nut engages the protruding annular shoulder 135 of the valve body 132, locking the valve device 22 to the actuator assembly 23.

This axial compression against the valve device 22, by the spanner nut, provides the further benefit of compressing the encoder shaft 38 and the collective drive shaft components together between the valve device 22 and the motor device 21. This is imperative to eliminate axial movement between the components during operation, as well as secure the valve within the actuator housing.

It is also imperative to properly align or position the ports of the stator face of the stator device in order to properly communicate with the channel of the rotor face so that the ports can be selectively connected. Similarly, this alignment is performed by providing a valve key mechanism 140 configured to cooperate between the body 132 of the valve device 22 and the housing 27 of the actuator assembly 23 for aligned orientation of the valve device. FIGS. 3, 10 and 14 best illustrate that the key mechanism 140 is provided by a simple key and slot arrangement. In one embodiment, the annular rim 136 of the housing barrel portion 43 includes longitudinally extending nub slot 141, while the body 132 of the valve device 22 includes a nub 142 protruding radially therefrom. The nub slot 141 is formed and dimensioned for longitudinal sliding receipt of a nub 142 during receipt of the valve body 132 in the distal barrel portion 43 of the actuator housing. This alignment between the valve body 132 and the actuator housing 27 functions to position the valve within the actuator, thereby positioning the ports of the stator device 122 at a known orientation that is selectively accessible by the rotor channel of the rotor device 121.

In another aspect of the present invention, all engaging components of system are composed of materials that eliminate the need for the application of any external lubrication. By incorporating lubricating fillers or encapsulated lubricants into the material compositions of the gear train components, coupling device components and bearing components, a sufficient amount of lubrication is provided that eliminates any maintenance requirements for external lubrication. Hence over the operational life of the system, the maintenance requirements are significantly reduced.

For example, in one specific embodiment, the components of the system can be all, or in part, composed of injection molded high strength engineered composite materials that contain lubricating fillers, such as Polytetrafluoroethylene (PTFE or TEFLON™) or Polyperfluoropolyether (PFPE). By way of example, the ball bearings, gears, couple member, drive shaft and carrier platforms are all composed of high strength injection molded plastics such as about 30% Glass Filled Nylon which incorporate about 15% PTFE. The ball bearings, in addition incorporate about 1% PFPE. These compositions provide high strength and high torsional rigidity, with very long operational life, while at the same time enabling millions of actuations without the need for any additional external lubrication. Similarly, the actuator housing 27 are also composed of high strength injection molded plastics, such as about 30% Carbon filled Polyester which incorporates about 15% PTFE.

In still another aspect of the present invention, a valve identification device (not shown) is included to facilitate identification of which type or kind of valve device 22 is removably mounted to the actuator assembly. As previously indicated, the present invention enables two or more different multi-position valve devices to be mounted to the same actuator assembly 23, and still enable precise operation thereof. However, in order to properly operate the mounted valve device, it is imperative to identify which valve device that is currently mounted to the actuator assembly (i.e., whether it is a six position or ten position, etc. valve).

The identification device may be as simple as a set of markings affixed to the valve devices wherein the operator may then be required to actively select which set of instructions correspond to the above-mentioned control unit (not shown). More preferably, however, the identification is electronically implemented. Currently, two technologies are in wide application, mainly in the retail sector for quickly transferring information. One technique is optical bar coding in a line format that is widely used in UPC product coding and 3D grid patterns to encode more information. The identification technology that is gaining popularity in the retail sector is Radio frequency ID (RFID). RFID is commonly applied in the retail sector to secure merchandise and to passively respond to an RF enquiry or actively (a more complex device with a battery) broadcast information when polled.

In this specific application, these active RFID devices may also be employed to interact with and be programmed by the master controller unit. By mounting a transmitter device to the corresponding valve device, a receiver (reader) device, coupled to the master controller unit, can be employed to read all compatible modules that may mate to the instrument. The master controller must be programmed with a set of instructions that correspond to the ID number that is identified and/or received. In this manner, the system may then automatically configure the control until to the set of operations that correspond to that valve device.

Moreover, such RFID devices may be applied to the system as an information transfer. The capability of an analytical instrument may be enhanced if the components are replaceable either for a maintenance purpose or for a reconfiguration purpose. In the maintenance case, some of the information transferred to the instrument controller could include expected lifetime or periodic maintenance, such that the master controller would know when to ask for component maintenance. In the set-up or configuration case, the ID code might initialize a set of reprogramming instructions that might include: 1) redefinition of the motor drive parameters for the actuator (useful for change of speed or torque) and 2) redefinition of the sensor outputs (useful for a change in angular position of the actuator). Thus the novel application would be to employ a type of coding to signal the master controller the properties and capabilities of that particular configuration.

Although the present invention has been described in connection with the preferred form of practicing it and modifications thereto, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

What is claimed is:

1. A micro-fluidic valve actuator assembly operably mounted between a drive motor and a multi-position micro-fluidic valve device, said valve device having a valve shaft rotating about a valve axis thereof between a plurality of discrete fluid distribution positions, said actuator assembly comprising:
an actuator housing having an exterior wall and an interior wall, said interior wall defining an interior through-chamber having a proximal portion, a distal portion and a chamber axis;
a drive assembly rotatably positioned within said chamber proximate to said proximal portion, said drive assembly having a drive axis of rotation positioned substantially co-axial with said chamber axis, said drive axis having a proximal portion rotatably coupled to said drive motor; and
a stand alone encoder assembly including a support structure, an encoder shaft rotatably mounted to said support structure for rotation about an encoder shaft axis, an encoder wheel mounted to said encoder shaft for rotation about the encoder shaft axis, and an encoder module mounted to said support structure, said encoder module cooperating with the encoder wheel, as a preset unit, to determine the rotational position of the encoder shaft about the encoder shaft axis, said support structure being configured for positioning within said housing at a mounting position, enabling rotational coupling of a proximal portion of the encoder shaft to a distal portion of the drive assembly, and enabling rotational coupling of a distal portion of the encoder shaft to a proximal portion of the valve shaft when the multi-position fluid valve device is mounted to the distal portion of the actuator housing;
wherein said support structure is free of rigid coupling directly to said actuator housing.

2. The micro-fluidic valve actuator assembly according to claim 1, wherein
said support structure is configured to cooperate with the housing, in the mounting position, to permit minute movement of the encoder assembly, relative to the housing, in three degrees of freedom.

3. The micro-fluidic valve actuator assembly according to claim 2, wherein
one degree of freedom includes minute movement in a direction substantially parallel to the chamber axis.

4. The micro-fluidic valve actuator assembly according to claim 3, wherein
said minute movement is in the range of at least about 0.041 inches.

5. The micro-fluidic valve actuator assembly according to claim 2, wherein
one degree of freedom includes minute movement in a direction substantially perpendicular to the chamber axis.

6. The micro-fluidic valve actuator assembly according to claim 5, wherein
said minute movement is in the range of at least about 0.014 inches.

7. The micro-fluidic valve actuator assembly according to claim 2, wherein
one degree of freedom includes minute rotational movement substantially about an axis that is spaced apart from, but oriented substantially parallel to, the chamber axis.

8. The micro-fluidic valve actuator assembly according to claim 7, wherein
said minute rotational movement is in the range of at least about ±3°.

9. The micro-fluidic valve actuator assembly according to claim 2, wherein
said exterior wall of said housing defines a side opening extending from the exterior wall into the interior through-chamber, said side opening being formed and dimensioned for insert and receipt of the encoder assembly to the mounting position.

10. The micro-fluidic valve actuator assembly according to claim 9, wherein
said housing includes opposed alignment walls accessible from the housing side opening, and
said support structure includes two spaced-apart dowel pins configured to slideably engage the opposed alignment walls when the encoder assembly is in the mounting position, said alignment wall substantially preventing displacement of the dowel pin in directions perpendicular to the alignment walls.

11. The micro-fluidic valve actuator assembly according to claim 10, wherein
said opposed alignment walls are substantially contained is corresponding contact planes oriented substantially parallel to the chamber axis.

12. The micro-fluidic valve actuator assembly according to claim 11, wherein
the corresponding contact planes of the opposed alignment walls are further oriented substantially parallel to one another.

13. The micro-fluidic valve actuator assembly according to claim 10, wherein
said support structure includes a generally plate-shaped bracket member having a first bracket wall and an opposed second bracket wall, said dowel pins extending outwardly from said first bracket wall.

14. The micro-fluidic valve actuator assembly according to claim 13, wherein
said encoder shaft axis is oriented transverse to said first and second bracket walls.

15. The micro-fluidic valve actuator assembly according to claim 13, wherein
said encoder module is mounted to the second bracket wall.

16. The micro-fluidic valve actuator assembly according to claim 13, wherein
said bracket member further includes opposed side walls extending between the first and second bracket walls, and tapering inwardly relative to one another toward an insert portion thereof, said insert portion configured for initial insertion of the encoder assembly through the housing side opening to the mounting position.

17. The micro-fluidic valve actuator assembly according to claim 16, wherein
one degree of freedom includes minute movement in a direction substantially perpendicular to the encoder shaft axis, and said insert portion of the bracket member includes an abutting end formed and dimensioned for abutting contact with the chamber interior wall, to limit said minute movement of the bracket member in said direction substantially perpendicular to the encoder shaft axis, when in the mounting position.

18. The micro-fluidic valve actuator assembly as defined by claim 1, wherein
said drive assembly includes a shaft carrier device, having a distal shaft portion configured to operably mount to the proximal portion of encoder shaft, a carrier platform, having a proximal portion configured to operably mount to the drive motor, and a gear train assembly, operably disposed between said carrier platform and said shaft carrier device for selective rotational speed control of said shaft carrier device about the drive axis.

19. The micro-fluidic valve actuator assembly as defined by claim 18, wherein
a distal end of said shaft carrier device defines an opening into a receiving socket formed and dimensioned for axial sliding receipt of a proximal end of said encoder shaft.

20. The micro-fluidic valve actuator assembly as defined by claim 19, wherein
a transverse, cross-sectional footprint of the proximal portion of the encoder shaft and a transverse, cross-sectional footprint of the receiving socket of the shaft carrier device cooperate for aligned rotational mating therebetween generally about the encoder shaft axis.

21. The micro-fluidic valve actuator assembly as defined by claim 20, wherein
said drive assembly further includes a fastener removably affixing the shaft carrier device to the encoder shaft, when the encoder assembly is in the mounting position.

22. The micro-fluidic valve actuator assembly as defined by claim 1 wherein
a distal end of said encoder shaft defines an opening into a receiving socket formed and dimensioned for axial sliding receipt of a proximal end of said valve shaft.

23. The micro-fluidic valve actuator assembly as defined by claim 22, wherein
a transverse, cross-sectional footprint of the proximal portion of the valve shaft and a transverse, cross-sectional footprint of the receiving socket of the encoder shaft cooperate for aligned rotational mating therebetween generally about the encoder shaft axis.

24. The micro-fluidic valve actuator assembly as defined by claim 23, wherein
the housing distal portion includes a barrel portion having a distal end opening formed and dimensioned for sliding receipt of at least a portion of the valve device therein for mounting thereto when said valve shaft is received in said receiving slot of the encoder shaft.

25. A multi-position micro-fluidic valve system operably mounted to a drive motor, said valve system comprising:
a housing having an exterior wall and an interior wall, said interior wall defining an interior through-chamber having a proximal portion, a distal portion and a chamber axis;
a drive assembly rotatably positioned within said chamber proximate to said proximal portion, said drive assembly having a drive axis of rotation positioned substantially co-axial with said chamber axis, said drive axis having a proximal portion rotatably coupled to said drive motor;
a removable, stand alone, self contained encoder assembly including a support structure, an encoder shaft rotatably mounted to said support structure for rotation about an encoder shaft axis, and an encoder device configured to determine the rotational position of the encoder shaft about the encoder shaft axis, said support structure being configured for positioning within said housing at a mounting position, enabling rotational coupling of a proximal portion of the encoder shaft to a distal portion of the drive assembly; and
a multi-position micro-fluidic valve device having a valve shaft rotating about a valve axis thereof between a plurality of discrete fluid distribution positions, said valve device being mountable to the distal portion of the housing in manner enabling rotational coupling of a proximal portion of the valve shaft to a distal portion of the encoder shaft when the encoder assembly is in the mounting position;
wherein said support structure is free of rigid coupling directly to said actuator housing.

26. The multi-position micro-fluidic valve system according to claim 25, wherein
said encoder device includes an encoder wheel mounted to said encoder shaft for rotation about the encoder shaft axis, and an encoder module mounted to said support structure, said encoder module cooperating with the encoder wheel, as a preset unit, to determine said rotational position of the encoder shaft about the encoder shaft axis.

27. The multi-position micro-fluidic valve system as defined by claim 26, wherein
a distal end of said encoder shaft defines an opening into a receiving socket formed and dimensioned for axial sliding receipt of a proximal end of said valve shaft.

28. The multi-position micro-fluidic valve system as defined by claim 27, wherein
a transverse, cross-sectional footprint of the proximal portion of the valve shaft and a transverse, cross-sectional footprint of the receiving socket of the encoder shaft cooperate for aligned rotational mating therebetween generally about the encoder shaft axis.

29. The multi-position micro-fluidic valve system as defined by claim 28, wherein
the housing distal portion includes a barrel portion having a distal end opening formed and dimensioned for sliding receipt of at least a portion of the valve device therein for mounting thereto when said valve shaft is received in said receiving slot of the encoder shaft.

30. The multi-position micro-fluidic valve system according to claim 25, wherein
said support structure is configured to cooperate with the housing, in the mounting position, to permit minute movement of the encoder assembly, relative to the housing, in three degrees of freedom.

31. The multi-position micro-fluidic valve system according to claim 30, wherein
one degree of freedom includes minute movement in a direction substantially parallel to the chamber axis.

32. The multi-position micro-fluidic valve system according to claim 31, wherein
said minute movement is in the range of at least about 0.041 inches.

33. The multi-position micro-fluidic valve system according to claim 30, wherein
one degree of freedom includes minute movement in a direction substantially perpendicular to the chamber axis.

34. The multi-position micro-fluidic valve system according to claim 33, wherein
said minute movement is in the range of at least about 0.014 inches.

35. The multi-position micro-fluidic valve system according to claim 30, wherein
one degree of freedom includes minute rotational movement substantially about an axis that is spaced apart from, but oriented substantially parallel to, the chamber axis.

36. The multi-position micro-fluidic valve system according to claim 35, wherein
said minute rotational movement is in the range of at least about ±3°.

37. The multi-position micro-fluidic valve system according to claim 30, wherein
said exterior wall of said housing defines a side opening extending from the exterior wall into the interior through-chamber, said side opening being formed an dimensioned for insert receipt of the encoder assembly to the mounting position.

38. The multi-position micro-fluidic valve system according to claim 30, wherein
said housing includes opposed alignment walls accessible from the housing side opening, and
said support structure includes two spaced-apart dowel pins configured to slideably engage the opposed alignment walls when the encoder assembly is in the mounting position, said alignment wall substantially preventing displacement of the dowel pin in directions perpendicular to the alignment walls.

39. The multi-position micro-fluidic valve system according to claim 38, wherein
said opposed alignment walls are substantially contained is corresponding contact planes oriented substantially parallel to the chamber axis.

40. The multi-position micro-fluidic valve system according to claim 39, wherein
the corresponding contact planes of the opposed alignment walls are further oriented substantially parallel to one another.

41. The multi-position micro-fluidic valve system according to claim 38, wherein
said support structure includes a generally plate-shaped bracket member having a first bracket wall and an opposed second bracket wall, said dowel pins extending outwardly, in opposed directions, from said first and second bracket walls.

42. The multi-position micro-fluidic valve system according to claim 41, wherein
said encoder shaft axis is oriented transverse to said first and second bracket walls.

43. The multi-position micro-fluidic valve system according to claim 41, wherein
said encoder module is mounted to the second bracket wall.

44. The multi-position micro-fluidic valve system according to claim 41, wherein
said bracket member further includes opposed side walls extending between the first and second bracket walls, and tapering inwardly relative to one another toward an insert portion thereof, said insert portion configured for initial insertion of the encoder assembly through the housing side opening to the mounting position.

45. The multi-position micro-fluidic valve system according to claim 44, wherein
one degree of freedom includes minute movement in a direction substantially perpendicular to the encoder shaft axis, and
said insert portion of the bracket member includes an abutting end formed and dimensioned for abutting contact with the chamber interior wall, to limit said minute movement of the bracket member in said direction substantially perpendicular to the encoder shaft axis, when in the mounting position.

46. The multi-position micro-fluidic valve system as defined by claim 45, wherein
said drive assembly includes a shaft carrier device, having a distal shaft portion configured to operably mount to the proximal portion of encoder shaft, a carrier platform, having a proximal portion configured to operably mount to the drive motor, and a gear train assembly, operably disposed between said carrier platform and said shaft carrier device for selective rotational speed control of said shaft carrier device about the drive axis.

47. The multi-position micro-fluidic valve system as defined by claim 44, wherein
a distal end of said shaft carrier device defines an opening into a receiving socket formed and dimensioned for axial sliding receipt of a proximal end of said encoder shaft.

48. The multi-position micro-fluidic valve system as defined by claim 47, wherein
a transverse, cross-sectional footprint of the proximal portion of the encoder shaft and a transverse, cross-sectional footprint of the receiving socket of the shaft carrier device cooperate for aligned rotational mating therebetween generally about the encoder shaft axis.

49. The multi-position micro-fluidic valve system as defined by claim 48, wherein
said drive assembly further includes a fastener removably affixing the shaft carrier device to the encoder shaft, when the encoder assembly is in the mounting position.

50. The multi-position micro-fluidic valve system as defined by claim 25, wherein
said multi-position fluid valve devices include up to a 96 position rotary valve.

51. The multi-position micro-fluidic valve system as defined by claim 50, further including:
a valve identification device configured to facilitate identification of the type of valve device that is removably mounted to the actuator assembly.

52. A removable, stand alone, self contained encoder assembly for a micro-fluidic valve actuator assembly operably mounted between a drive motor and a multi-position micro-fluidic valve device, said valve device having a valve shaft rotating about a valve axis thereof between a plurality of discrete fluid distribution positions, said actuator assembly having a housing with an interior wall defining an interior through-chamber having a chamber axis, said encoder assembly comprising:
a relatively rigid bracket member having a first bracket wall and a generally opposed second bracket wall, said bracket member being sized and dimensioned for insertion into the through-chamber of the housing to a mounting position in the interior through-chamber;
an encoder shaft rotatably mounted to said bracket member such that a proximal portion thereof extends outwardly from the first bracket wall, and a distal portion of the encoder shaft extends outwardly from the second bracket wall, said encoder shaft being oriented relative to said bracket member such that an encoder shaft axis of rotation will be generally co-axial with the chamber axis when the encoder assembly is positioned substantially at the mounting position in the interior through-chamber of the actuator housing, enabling rotational coupling of the proximal portion of the encoder shaft to the drive motor, and enabling rotational coupling of the distal portion of the encoder shaft to the valve shaft when the multi-position fluid valve device, free of rigid coupling directly to the actuator assembly housing wherein said relatively rigid bracket member is;

an encoder wheel mounted to said encoder shaft for rotation about the encoder shaft axis;

an encoder module mounted to said bracket member, and configured to cooperate with the encoder wheel, as a preset unit, to determine the rotational position of the encoder shaft about the encoder shaft axis; and an alignment device mounted to said bracket member in a manner cooperating with the actuator housing to facilitate guidance of the encoder assembly toward the mounting position and into the interior through-chamber.

53. The encoder assembly according to claim 52, wherein said alignment device includes two spaced-apart dowel pins configured to slideably engage the actuator housing to guide the encoder assembly toward the mounting position.

54. The encoder assembly according to claim 53, wherein said dowel pins extending outwardly from said first bracket wall.

55. The encoder assembly according to claim 54, wherein said encoder shaft axis is oriented transverse to said first and second bracket walls.

56. The encoder assembly according to claim 55, wherein said encoder module is mounted to the second bracket wall.

57. The encoder assembly according to claim 56, wherein said bracket member further includes opposed side walls extending between the first and second bracket walls, and tapering inwardly relative to one another toward an insert portion thereof, said insert portion configured for initial insertion of the encoder assembly into the housing through-chamber toward the mounting position.

* * * * *